(12) United States Patent
Johnson

(10) Patent No.: US 12,194,902 B2
(45) Date of Patent: *Jan. 14, 2025

(54) SUSPENSION SYSTEM

(71) Applicant: Suspension Systems Technologies, Inc., Seattle, WA (US)

(72) Inventor: Peter Wallace Johnson, Seattle, WA (US)

(73) Assignee: SUSPENSION SYSTEMS TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,803

(22) Filed: Dec. 11, 2023

(65) Prior Publication Data

US 2024/0101006 A1 Mar. 28, 2024

Related U.S. Application Data

(63) Continuation of application No. 17/900,689, filed on Aug. 31, 2022, now Pat. No. 11,884,193.

(60) Provisional application No. 63/239,637, filed on Sep. 1, 2021.

(51) Int. Cl.
*B60N 2/00* (2006.01)
*B60N 2/50* (2006.01)
*B60N 2/52* (2006.01)
*B60N 2/54* (2006.01)

(52) U.S. Cl.
CPC ............. *B60N 2/505* (2013.01); *B60N 2/508* (2013.01); *B60N 2/527* (2013.01); *B60N 2/54* (2013.01)

(58) Field of Classification Search
None
See application file for complete search history.

(56) References Cited

U.S. PATENT DOCUMENTS

| 4,350,317 | A | * | 9/1982 | Aondetto | B60N 2/502 248/588 |
| 4,448,386 | A | * | 5/1984 | Moorhouse | B60N 2/544 248/564 |
| 4,461,444 | A | | 7/1984 | Grassi et al. | |
| 5,058,852 | A | | 10/1991 | Meier et al. | |
| 5,169,112 | A | | 12/1992 | Boyles et al. | |
| 5,222,709 | A | | 6/1993 | Culley, Jr. et al. | |
| 5,251,864 | A | * | 10/1993 | Itou | B60N 2/508 248/588 |

(Continued)

FOREIGN PATENT DOCUMENTS

EP 2163425 A1 3/2010

OTHER PUBLICATIONS

International Search Report and Written Opinion of the International Application No. PCT/US2022/042241, mailed Dec. 6, 2022, 12 pg.

*Primary Examiner* — Steven M Marsh
(74) *Attorney, Agent, or Firm* — Fredrikson & Byron, P.A.

(57) ABSTRACT

A space-saving suspension apparatus comprising a coarse suspension device, a mechanical assembly, and a fine suspension device coupling a supported frame to a base frame at a neutral height such that forces and/or displacements of either the base frame or the supported frame result in oppositely directed forces and/or displacements of the other of the base frame and the supported frame. In some embodiments, the neutral height is adjustable.

27 Claims, 17 Drawing Sheets

(56) References Cited

U.S. PATENT DOCUMENTS

| | | | | |
|---|---|---|---|---|
| 5,794,911 | A * | 8/1998 | Hill | B60N 2/544 |
| | | | | 248/419 |
| 6,082,715 | A | 7/2000 | Vandermolen | |
| 7,461,849 | B2 | 12/2008 | Robbins et al. | |
| 7,628,409 | B2 | 12/2009 | Robbins et al. | |
| 8,424,832 | B2 | 4/2013 | Robbins et al. | |
| 8,424,885 | B2 | 4/2013 | Woodbury, II et al. | |
| 9,528,567 | B2 | 12/2016 | Robbins et al. | |
| 9,822,923 | B2 | 11/2017 | Woodbury, II | |
| 9,982,834 | B2 | 5/2018 | Woodbury, II | |
| 10,575,443 | B2 | 2/2020 | Woodbury, II et al. | |
| 10,641,430 | B2 | 5/2020 | Woodbury, II | |
| 2003/0201660 | A1 * | 10/2003 | Janscha | B60N 2/505 |
| | | | | 297/216.17 |
| 2010/0066146 | A1 * | 3/2010 | Weber | B60N 2/162 |
| | | | | 297/340 |
| 2013/0206949 | A1 * | 8/2013 | Archambault | B60N 2/508 |
| | | | | 248/421 |
| 2014/0131542 | A1 * | 5/2014 | Hodnefield | B60N 2/509 |
| | | | | 248/419 |
| 2015/0232004 | A1 | 8/2015 | Haller et al. | |
| 2015/0232005 | A1 | 8/2015 | Haller et al. | |
| 2016/0207430 | A1 | 7/2016 | Haller | |
| 2016/0313140 | A1 * | 10/2016 | Pelka | G01D 5/147 |
| 2018/0072189 | A1 | 3/2018 | Plante et al. | |
| 2019/0381916 | A1 * | 12/2019 | Hill | B60N 2/505 |
| 2020/0122612 | A1 | 4/2020 | Fillep et al. | |
| 2020/0317095 | A1 | 10/2020 | Woodbury, II | |
| 2021/0178942 | A1 * | 6/2021 | Dotzler | B60N 2/508 |
| 2021/0199238 | A1 | 7/2021 | Woodbury, II | |
| 2023/0116980 | A1 | 4/2023 | Song et al. | |

* cited by examiner

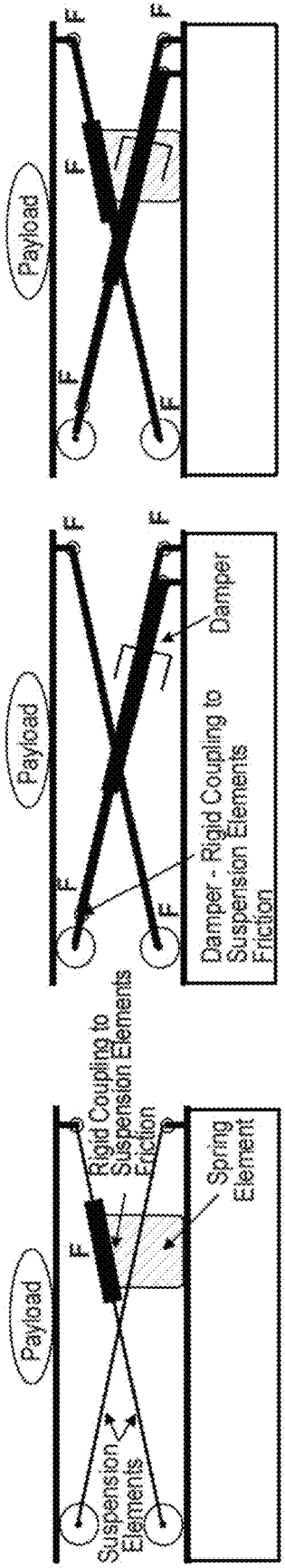
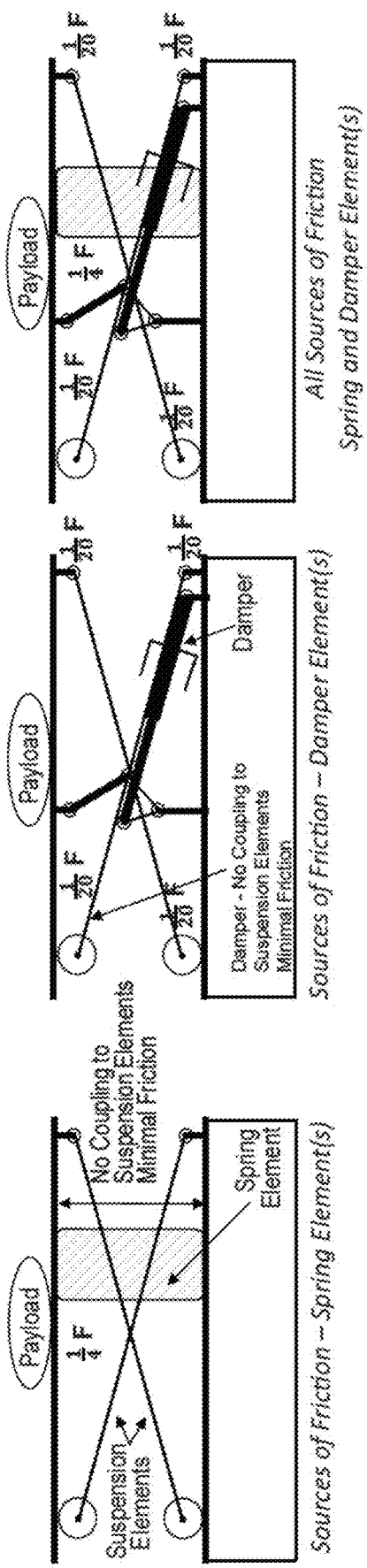
FIG. 4A
FIG. 4B

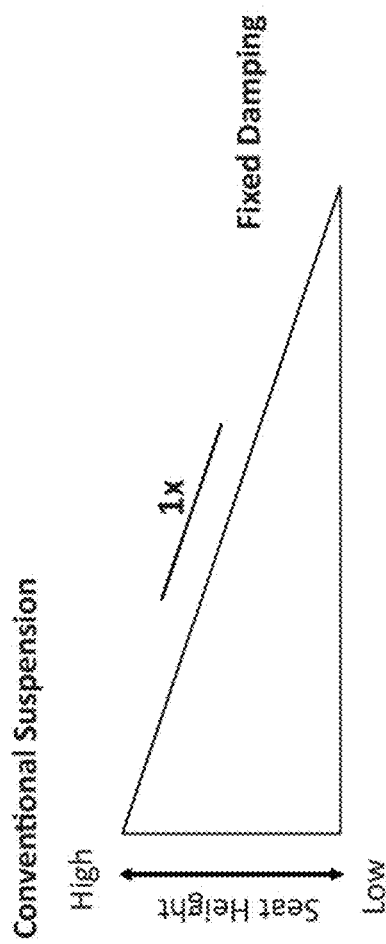
FIG. 6A
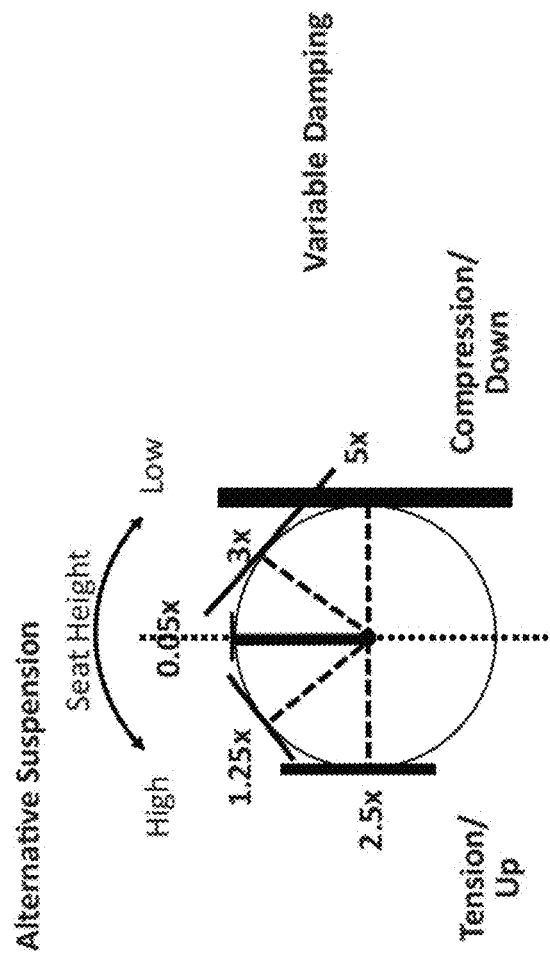
FIG. 6B
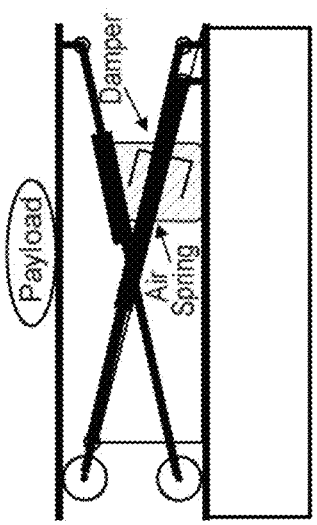
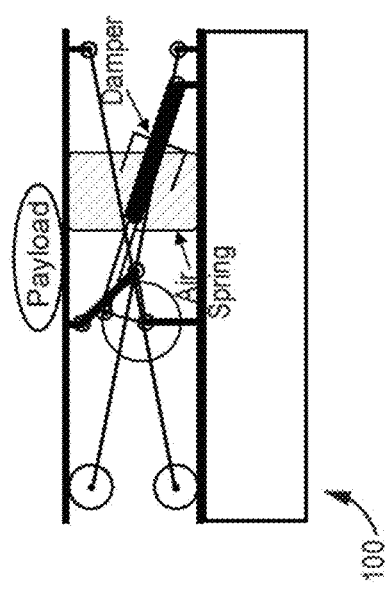

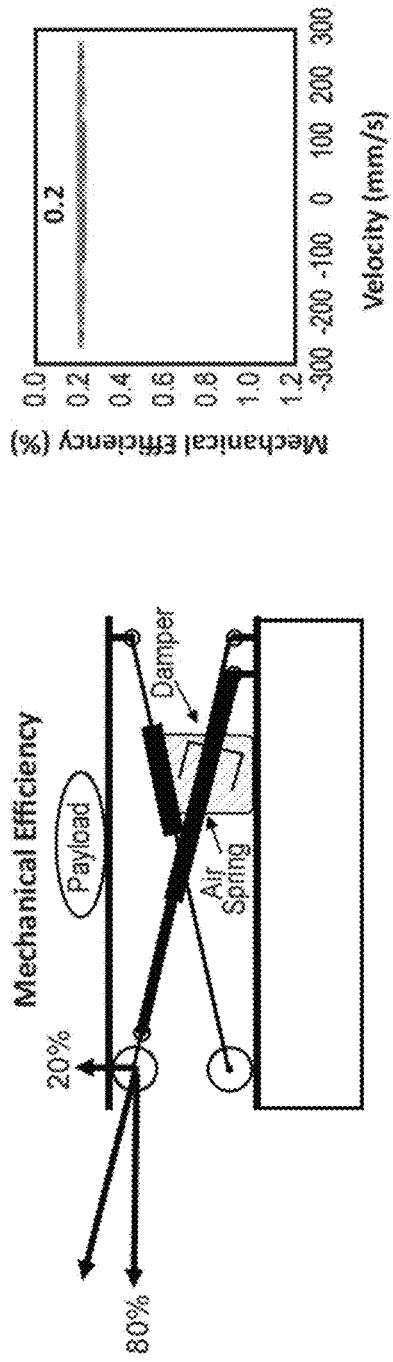
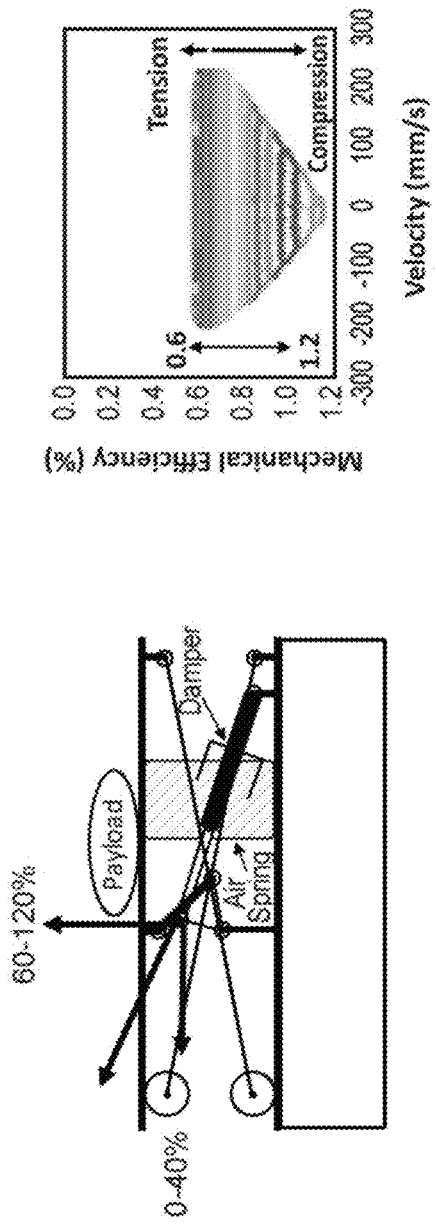
FIG. 12A
FIG. 12B

SUSPENSION SYSTEM

RELATED APPLICATIONS

This application is a continuation of U.S. patent application Ser. No. 17/900,689, filed Aug. 31, 2022, which claims priority to U.S. Provisional Patent Application No. 63/239,637, filed Sep. 1, 2021, both of which are incorporated herein by reference in their respective entireties.

TECHNICAL FIELD

This disclosure relates generally to suspension systems and related apparatus for minimizing displacement and vibration to a payload during transportation thereof.

BACKGROUND

Suspension systems are used in conjunction with various modes of transportation employed to transport a payload from one location to another. In most instances, it is advantageous to reduce the amount of energy transferred to the payload in the form of forces, movement/displacement, vibration, etc., resulting from movement during various forms of transportation. A reduction in the amount of road vibration transferred to operators and/or passengers in a motor vehicle, for example, may help minimize discomfort and/or injury, such as back pain, that may be caused by the road vibration Similar benefits would apply to other types of payloads (e.g., delicate or sensitive materials) and to other forms of transportation (e.g., air, water, etc.). Efforts continue, therefore, to enhance shock absorption performance for virtually any payload and for virtually any type of mobile environment.

SUMMARY

In general, this disclosure is directed to suspension systems for supporting a payload, passenger, or operator during transportation. This disclosure describes embodiments including a suspension apparatus having a coarse suspension device, a mechanical assembly, and a fine suspension device that operate to couple a supported frame to a base frame. In some embodiment, the supported frame is supported a neutral height above the base frame by the suspension apparatus such that forces and/or displacements acting on either the base frame or the supported frame result in oppositely directed forces and/or displacements acting on the other of the base frame and the supported frame. In some embodiments, the neutral height may be adjustable.

In some embodiments, the suspension apparatus is a space-saving device that operates with only passive components. In some embodiments, a size reduction in the suspension apparatus may be accomplished via a mechanical assembly that converts forces and/or displacements of the base frame or supported frame in a generally vertical direction into forces or displacements that are generally in a horizontal direction. The converted horizontal force or displacement is then damped by the fine suspension device, which is generally horizontally disposed, and which thereby provides space savings (e.g., less vertical space required for the overall suspension apparatus.

In some embodiments, the conversion of vertically directed forces and/or displacements into horizontally directed forces and/or displacements may be configured to further enable oppositely directed (or "out of phase") forces and/or displacements of the other of the base frame or supported frame. That is, an upward force on the base frame would result in a downwardly directed force on the supported frame, and vice versa, according to some embodiments. This may occur due to interactions between the mechanical assembly and the fine suspension device, and their coupling to the supported frame and to the base frame, according to various embodiments.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements.

FIGS. 4A and 4B are schematic representations and comparisons of how friction is created by the spring element(s), damping element(s), and by the combination of suspension system elements in a conventional suspension system (uppermost images) versus a suspension system in accordance with the present disclosure (lowermost images).

FIGS. 6A and 6B provide schematic representations and comparisons of the nature of fixed or linear damping provided by a conventional suspension apparatus (top images) versus the variable or non-linear damping provided by a suspension apparatus in accordance with embodiments of the present disclosure (bottom images).

FIGS. 12A and 12B are schematic representations and plots showing damper mechanical efficiency plotted as a function of both velocity and suspension height for a conventional suspension (FIG. 12A) and a suspension system in accordance with embodiments of this disclosure (FIG. 12B), respectively.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Those skilled in the art will recognize that many of the noted examples have a variety of suitable alternatives.

Figure 1:
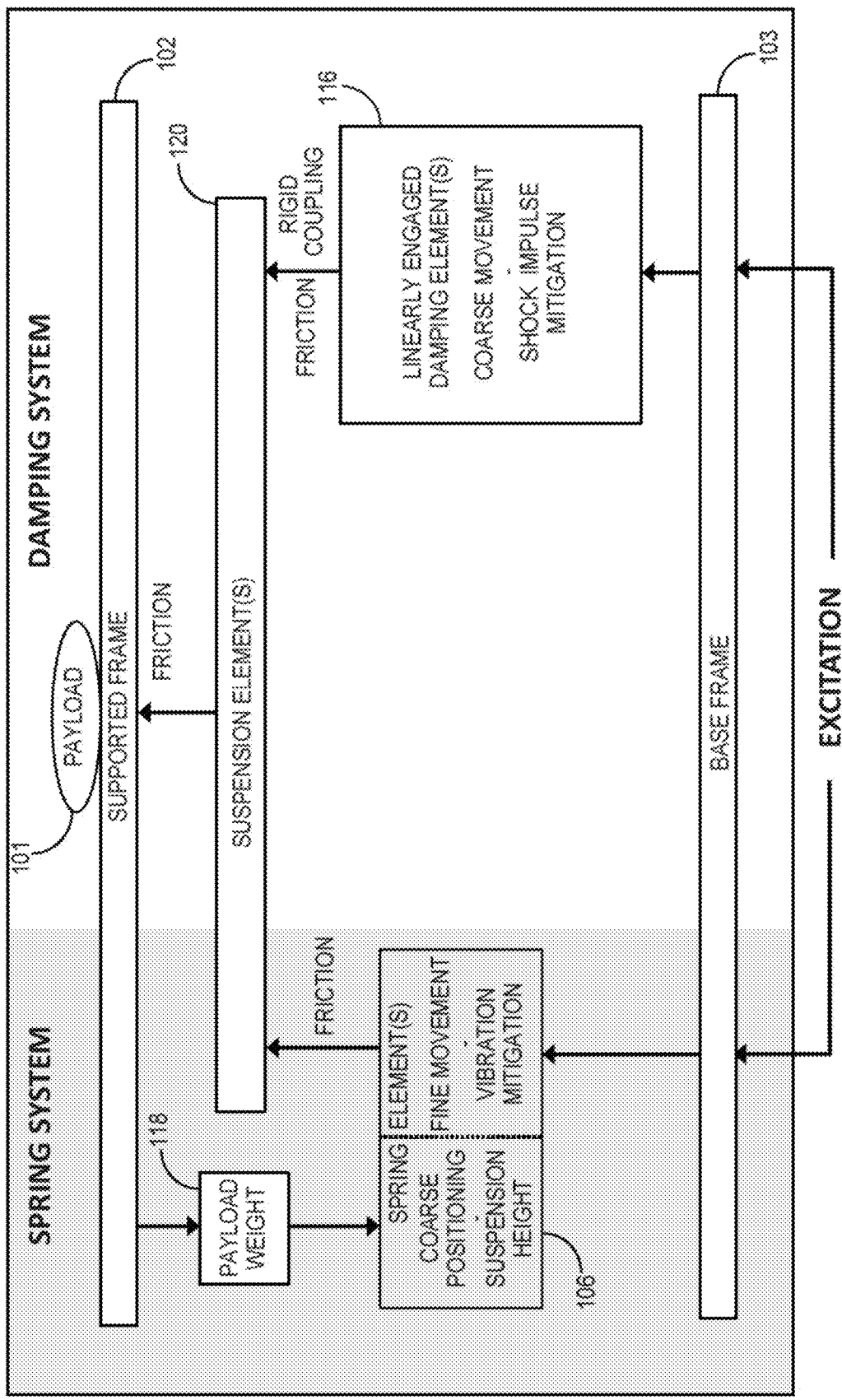
FIG. 1 is a block diagram illustrating a conventional passive acceleration/vibration mitigation system.

Conventional suspension systems are subjected to input accelerations, vibrations, velocities, and movements applied to the bottom, top, and/or sides of the suspension. FIG. 1 is a block diagram illustrating a conventional passive acceleration/vibration mitigation system. In many such current and commercially sold conventional suspension systems, when subjected to input accelerations, vibrations, velocities, and movements, the rigid and predominantly linear coupling of the coarse, mechanical damping element(s) (right side and darker shaded area in FIG. 1) causes the conventional suspension system payload 101 to move generally in-phase and/or in unison with the input movements and/or vibrations (e.g., see left and right images in FIG. 3A).

In addition, as shown in the left side and lighter shaded area of FIG. 1, the spring element(s) work in parallel with the damping element(s). As shown on the far-left side of FIG. 1, the spring element(s) will adjust the coarse positioning of the suspension based on the payload weight. In addition, as shown on the right side of the light shaded area in FIG. 1, the spring element(s) also provide vibration mitigation by helping control the fine movements of the suspension element(s). Finally, as shown by the lines with arrows connecting the spring and damping element(s) to the suspension element or elements, the spring, damping and suspension element(s) are all interconnected and tied to one another. The end result is that the suspension element(s) are subjected to static and viscous friction as a result of being directly and rigidly connected to the damping element(s) and resistance as a result of being directly connected to the spring element(s). In addition, with the spring element(s) connected to the suspension element or elements, the upward and downward movement of the spring is constrained by the static and viscous friction from being interconnected to the damping element(s).

Figure 2:
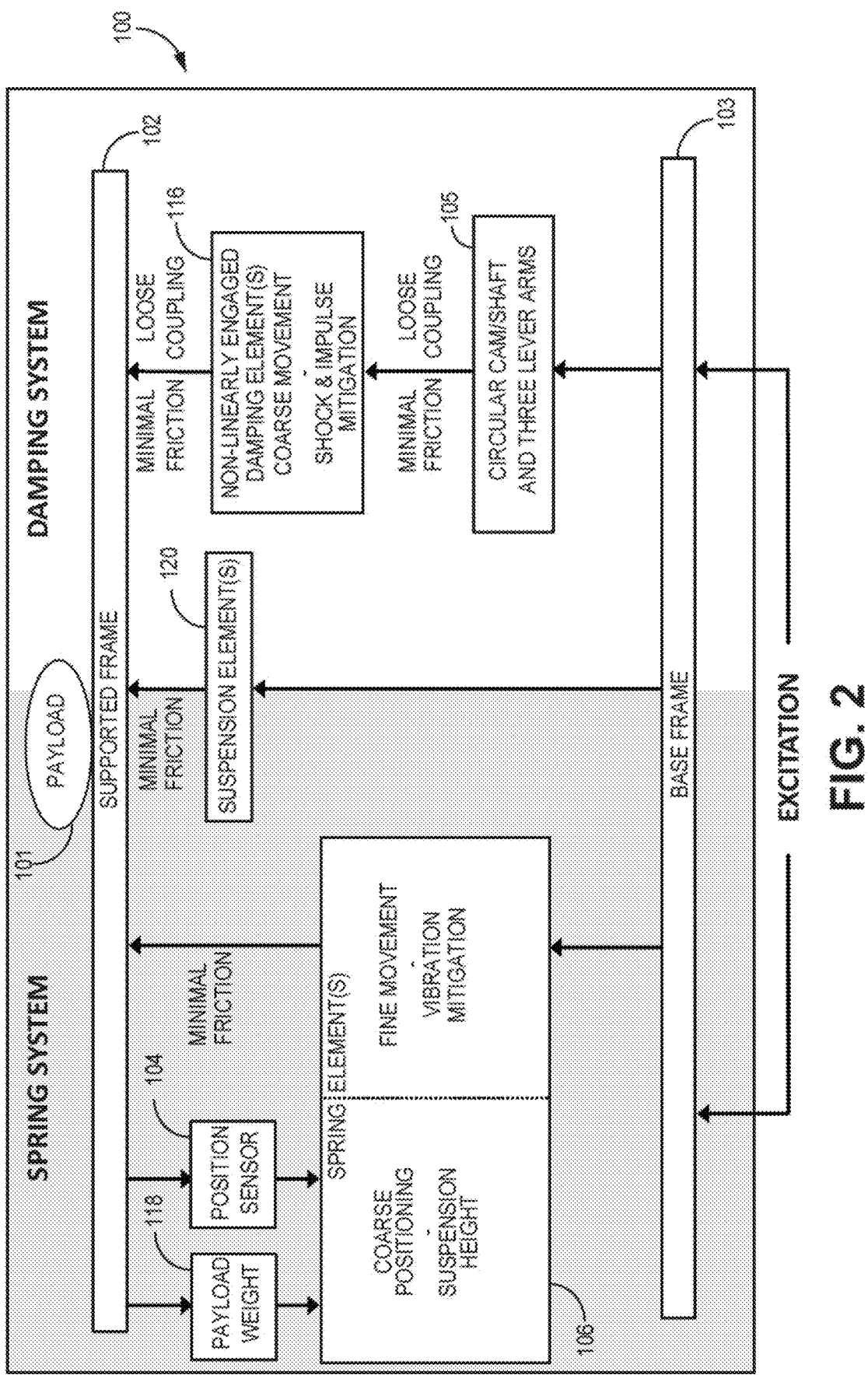
FIG. 2 is a block diagram illustrating a novel suspension apparatus with passive acceleration, movement, and vibration mitigation capabilities according to some embodiments of this disclosure.

FIG. 2 is a block diagram illustrating a passive acceleration, movement, and vibration mitigation system, which is also referred to herein as a suspension apparatus for supporting a payload, according to various embodiments of this disclosure. As shown in FIG. 2, the suspension apparatus 100 includes a support mount or base frame 103 and a supported frame 102 coupled to the base frame 103. The supported frame 102 is configured to be disposed vertically a neutral height above the base frame 103 when there is a payload 101 having a payload weight 118 disposed on and/or supported by the supported frame 102. Suspension apparatus 100 is configured to support relative displacement in a generally vertical direction between the supported frame 102 and the base frame 103 from a minimum height to a maximum height. The neutral height (e.g., the height at which the supported frame 102 is disposed vertically above the base frame 103 during steady state conditions, for example) would be somewhere between the minimum height and the maximum height. In some embodiments, the neutral height may be approximately mid-way between the base frame 103 and the supported frame 102. In other embodiments, the neutral height may be closer to the maximum height than to the minimum height. In still other embodiments, the neutral height may be closer to the minimum height than to the maximum height. In some embodiments, the neutral height may be between 55% and 80% of the travel distance from the minimum height to the maximum height. In some embodiments, the neutral height may be between 20% and 45% of the travel distance from the minimum height to the maximum height.

The supported frame 102 may be coupled to the base frame 103 via a number of elements shown in FIG. 2, including a scissor linkage, a coarse suspension device, a mechanical assembly, and a fine suspension device. For example, a suspension element such as a scissor linkage 120 may comprise a pair of crossed scissor arms (e.g., elongate rails or bars, for example) that are pivotably coupled together about a central pivot. Each scissor arm extends from the base frame 103 to the supported frame 102 and is free to rotate relative to the other scissor arm as the supported frame 102 and base frame 103 move closer to and/or farther away from each other. In some embodiments, there may be more than one pair of crossed scissor arms forming scissor linkage 120, for example.

A coarse suspension device 106 is illustrated in the block diagram of FIG. 2 coupling the base frame 103 to the supported frame 102. For example, coarse suspension device 106 may comprise one or more spring elements, and the spring elements may comprise mechanical springs (e.g., coiled springs) in some embodiments, or air springs in some other embodiments. In some embodiments, the characteristics of the spring elements may be adjustable; in the case of air springs, the air pressure associated with one or more of the air springs may be increased or decreased to vary the spring characteristics thereof. For example, the one or more air springs may be adjusted to a different air pressure based on the payload weight 118 and/or the neutral height. Coarse suspension device 106 is configured to oppose relative displacement between the base frame 103 and the supported frame 102 in the generally vertical direction (e.g., displacement that may be caused by forces imparted to one or more of the base frame 103 and the supported frame 102 in the generally vertical direction). The coarse suspension device 106 is not directly coupled to the scissor linkage 120, according to some embodiments of this disclosure. In some embodiments, coarse suspension device 106 is directly coupled to the base frame 103 and/or to the supported frame 102. The coarse suspension device 106 may be adjustable to support a payload 101 of payload weight 118 at a certain neutral height, according to some embodiments. For example, a payload 101 having a relatively heavy payload weight 118 may require an adjustment that increases the pressure of one or more air springs of coarse suspension device 106 in order to achieve a certain desired neutral height, according to some embodiments of this disclosure.

Figure 10A:
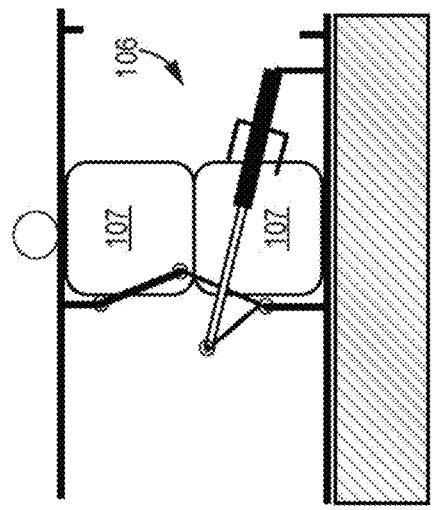
FIGS. 10A-10C are schematic representations of several configurations of a suspension apparatus having a coarse suspension device with and without blocks in accordance with embodiments of the present disclosure.
Figure 10B:
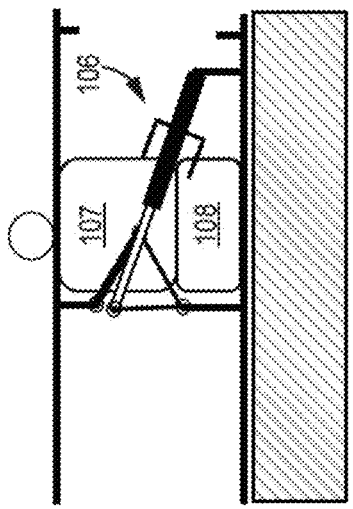
Figure 10C:
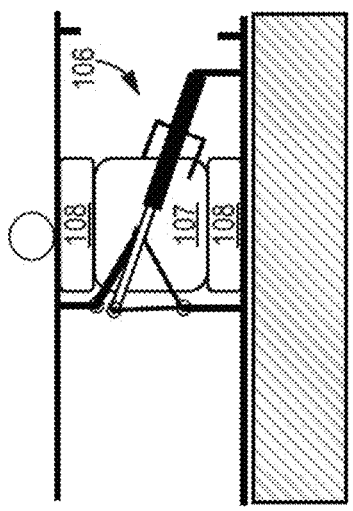

In some embodiments, coarse suspension device 106 may further comprise one or more elements coupled to either or both of the base frame 103 and the supported frame 102. FIGS. 10A-10C show several different configurations that may be suitable for a coarse suspension device 106 according to some embodiments. FIG. 10A, for example, shows coarse suspension device 106 comprising two spring elements 107 (e.g., air springs, coiled mechanical springs, etc.) coupled to each other in a series arrangement, and each spring element 107 coupled directly to either the base frame 103 or the supported frame 102. In embodiments of a suspension apparatus 100 having a coarse suspension device 106 comprising multiple spring elements 107, it is contemplated that the individual spring elements 107 may be separately adjustable to vary the spring constant thereof, for example. In the case of air springs, this might be accomplished by varying the air pressure in each according to specific requirements (e.g., to adjust the overall characteristics of coarse suspension device 106 to vary the distance between the base frame and the supported frame to a neutral height deemed to be appropriate for a particular payload weight, for example). In some embodiments, "blocks" 108 may be employed to occupy some of the vertical distance between the base frame and the supported frame, and/or to couple directly to either or both of the base frame and the supported frame. FIGS. 10B and 10C show an embodiment of suspension apparatus 100 using one block 108 and two blocks 108, respectively. The use of one or more blocks 108 in this manner (e.g., to occupy a portion of the available travel between the base frame and the supported frame) may be helpful and/or desirable in adjusting the coarse suspension device 106. Each block 108 may comprise a rigid (or at least somewhat rigid) component, but may be adjustable in some embodiments to occupy more or less of the vertical travel distance between the base frame and the supported frame. A block 108 may comprise a fastener to facilitate coupling to a spring element 107, as well as an adjustment mechanism (e.g., a lead screw arrangement, or a ratcheting arrangement, etc.) to lengthen and/or shorten the vertical space occupied by the block 108. As noted, the use of one or more blocks 108 may facilitate adjusting the coarse suspension device 106 to support the payload 101 at the neutral height, and/or to vary or control the travel distance from the minimum height of the supported frame 102 to the maximum height of the supported frame 102.

A mechanical assembly 105 is illustrated in the block diagram of FIG. 2 (e.g., a circular cam or shaft and three lever arms, according to some embodiments), as is a fine suspension device 116 (e.g., a damping element, according to some embodiments). Together, the mechanical assembly 105 and fine suspension device 116 couple the base frame 103 to the supported frame 102. In some embodiments, the fine suspension device 116 may comprise a damping element that is coupled to or engaged with the mechanical assembly 105. The coupling or engagement of the fine suspension device 116 to the mechanical assembly 105 may be non-linear due to the action or operation of the mechanical assembly 105, according to some embodiments. In the embodiment shown in FIG. 2, mechanical assembly 105 couples base frame 103 to fine suspension device 116, and fine suspension device 116 couples the mechanical assembly 105 to supported frame 102. However, it should be noted that this embodiment is exemplary only; the placement and coupling arrangement of the mechanical assembly 105 and fine suspension device 116 relative to the base frame 103 and supported frame 102 could be reversed, for example, according to some alternate embodiments. Mechanical assembly 105 may be configured to convert a relative displacement in the generally vertical direction between the base frame 103 and the supported frame 102 into a horizontal displacement. In turn, the mechanical assembly 105 is operably coupled to the fine suspension device 116, and damping is thereby provided by the fine suspension device 116 to damp the horizontal displacement converted or generated by the mechanical assembly 105. The mechanical assembly 105 is not directly coupled to the scissor linkage 120, nor is the fine suspension device 116, according to some embodiments of this disclosure. In some embodiments, there may be more than one fine suspension device 116; for example, there could be two fine suspension devices 116, one mounted on either side of the coarse suspension device 106, as but one possible example.

As noted above, fine suspension device 116 may comprise a damping element. Suitable damping elements for fine suspension device 116 may include, but are not limited to, dampers such as shock absorbers, for example, which are typically mechanical and/or hydraulic devices capable of absorbing vibrations and/or shock impulses. A suitable damper or dashpot may, for example, resist motion via viscous friction, and may in some cases, be combined with the use of springs and/or cushions, or valves and/or orifices, as some examples. Other damping elements known to those of ordinary skill in the art may be employed as fine suspension device 116, or in conjunction with fine suspension device 116, without departing from the scope of this disclosure.

In some embodiments, the damping provided by the fine suspension device 116 and the mechanical assembly 105 varies as a function of both the velocity of the horizontal displacement from the mechanical assembly, and the vertical distance between the base frame and the supported frame. In some further embodiments, the damping provided by the fine suspension device 116 and the mechanical assembly 105 increases as the vertical distance between the base frame 103 and the supported frame 102 increases and/or decreases. In some embodiments, the damping provided by the fine suspension device 116 and the mechanical assembly 105 has a minimum value corresponding to the neutral height, such that the damping provided by the fine suspension device 116 and the mechanical assembly 105 increases as the vertical distance between the base frame 103 and the supported frame 102 increases above the neutral height and decreases below the neutral height. However, this need not be the case, and situations may warrant having a minimum damping height that is not equal to the neutral height. This might be the case for a heavier than normal (or lighter than normal) payload, for example. In still further embodiments, the amount of damping increases in a non-linear manner as the vertical distance between the base frame 103 and the supported frame 102 increases above and decreases below the neutral height. For example, in embodiments where the neutral height is closer to the minimum height than to the maximum height, the damping provided by the fine suspension device 116 and the mechanical assembly 105 is greater as the vertical distance between the base frame 103 and the supported frame 102 decreases below the neutral height by a given amount X than when the vertical distance between the base frame 103 and the supported frame 102 increases above the neutral height by the same given amount X.

Suspension apparatus 100 functions such that a force (and resultant displacement) applied to either the base frame 103 or the supported frame 102 in a generally vertical direction will result in a generally opposite force being applied to the other of the base frame 103 and the supported frame 102. This resultant force may also be described as being "out-of-phase" with the initial force applied. The mechanical assembly 105 and fine suspension device 116 may operate in combination with each other to produce this effect, according to some embodiments.

A description of a suspension apparatus 100 according to a particular exemplary embodiment may serve to better illustrate the above-mentioned concepts and their potential benefits. For example, an exemplary embodiment of a suspension apparatus 100 may be configured to have a neutral height (e.g., the vertical distance between the base frame 103 and the supported frame 102 under "rest" or steady-state conditions) that is roughly one-third the distance from the minimum height (e.g., under maximum compression) to the maximum height (e.g., under maximum tension or extension). When such an embodiment travels over a depression in the terrain (such as a pothole, for example), the downward motion of the base frame 103 results in a generally opposite or out-of-phase force being applied to the supported frame 102 via the conversion of generally vertical forces into generally horizontal forces, etc., by the mechanical assembly 105, link arms 150, 152, lever arm 154, and cam/shaft 156. This action may be facilitated, for example, by the presence of very low frictional resistance (e.g., static and/or viscous friction) at or near the neutral height of suspension apparatus 100 in this scenario. In some such cases, the height of the supported frame 102 relative to the base frame 103 may extend as far as the maximum height (e.g., corresponding to a relatively large pothole or depression). This resulting condition of suspension apparatus 100 may proactively anticipate a subsequent rapid compression event (e.g., contacting the opposite side of the pothole or depression). Since the suspension apparatus 100 will be at its maximum height, and since the subsequent velocity will typically be high, the amount of damper force available to respond to the rapid compression event will also be much higher, which is a highly desirable result. Similar scenarios can easily be envisioned where the combination of a non-linear damping force response and an out-of-phase displacement relationship between the base frame 103 and supported frame 102 will result in desirable characteristics of suspension apparatus 100 that heretofore did not exist in passive suspension systems.

FIG. 4A includes three schematic representations of how friction is created by the spring element(s) in a conventional suspension system (left image), friction is created by the damping element(s) (middle image), and how all suspension elements combined create friction (right image). As shown in FIG. 4A, an undesirable outcome of the spring and damping element(s) being tied together and being rigidly coupled to the moving suspension element(s) is the creation of several sources of additional friction. These sources of additional static and viscous friction will limit the conventional suspension system's ability to attenuate both lower velocity random vibrations/movements, as well as moderate to higher frequency movements and vibrations.

In some embodiments of this disclosure, having the scissor linkage 120 not directly coupled to the coarse suspension device 106 or the fine suspension device 116 may result in a reduction in friction of the suspension apparatus 100. FIG. 4B, for example, shows portions of suspension apparatus 100 where a reduction in friction may result from the scissor linkage 120 not being directly coupled to the coarse suspension device 106 and/or to the fine suspension device 116. FIG. 4B includes three schematic representations of how at least a 4-fold reduction in friction may be created by the spring element(s) in a suspension system in accordance with the present disclosure (left image), at least a 20-fold reduction in friction is created by the damping element(s) (middle image), and how all suspension elements create at least a 20-fold reduction in friction (right image).

Figure 5A:
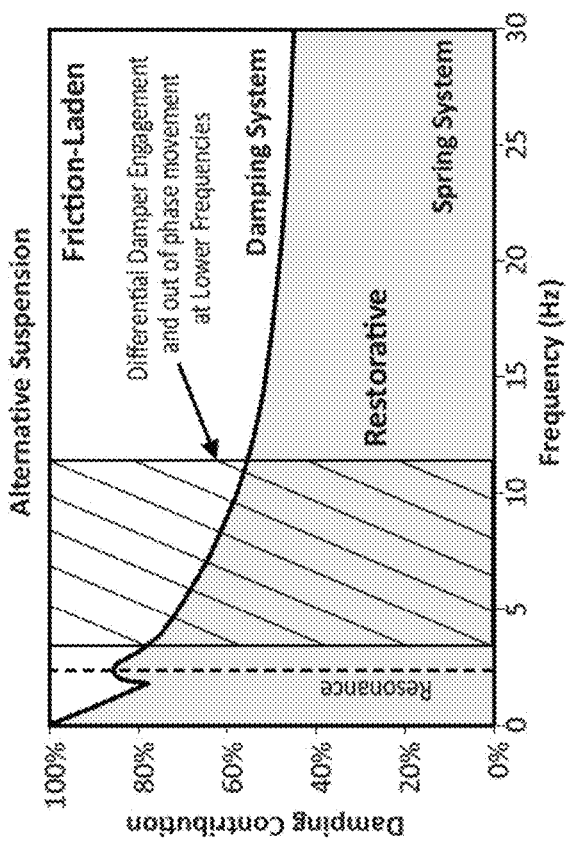
FIGS. 5A and 5B are performance diagrams comparing a conventional suspension system to a suspension system in accordance with embodiments of the present disclosure.

As shown by the light and dark areas and the sizes of the blocks for the spring and damping element(s) in FIG. 1 and FIG. 2 and by the light and dark shading in FIG. 5, the amount of movement and vibration mitigation from the restorative spring and the friction-laden damping elements or elements is different between the conventional and alternative suspension systems. For the conventional suspension system in FIG. 1 and the left portion of FIG. 5, the greater proportion of darker shaded area and the larger size of the block for the friction-laden damping element or elements, indicates that the friction-laden damping element(s) contribute more to the vibration and movement mitigation compared to the restorative spring element(s). Conversely, for the alternative suspension system shown in FIG. 2 and the right portion of FIG. 5, the greater proportion of lighter shaded area in FIG. 5 and the larger size of the block for the spring element or elements in FIG. 2, indicates that the restorative spring element(s) contribute more to the vibration and movement mitigation compared to the friction-laden damping element(s). The end result is the conventional suspension system has restorative spring element(s) that are softer or less stiff spring and fiction-laden damping element(s) with greater damping relative to the alternative suspension systems. As shown in FIG. 4 (and in FIGS. 8A and 8B, discussed below), the greater damping in the conventional suspension system creates (top image in FIG. 4, and corresponding light gray lines in FIGS. 8A and 8B) and subjects both the spring and suspension element(s) to at least 20-fold more static and viscous friction which reduces the performance of the conventional suspension system. As shown in the bottom image of FIG. 4, the end result is that the alternative suspension apparatus 100 may have significantly less friction (in some cases, as much as $\frac{1}{20}^{th}$ or better reduction in friction) as compared to the conventional suspension.

Figure 3A:
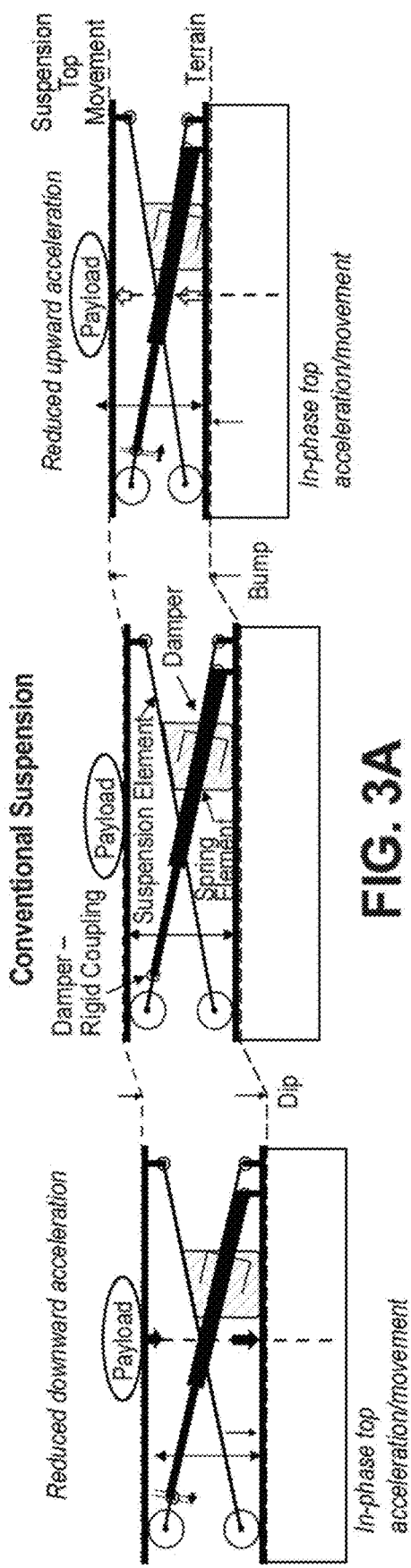
FIGS. 3A-3C are schematic representations and comparisons of a conventional suspension apparatus to a novel suspension apparatus in accordance with the present disclosure as each operates when encountering a depression (leftmost images), when on a flat surface at steady state (middle most images), and when encountering a bump (rightmost images).
Figure 3B:
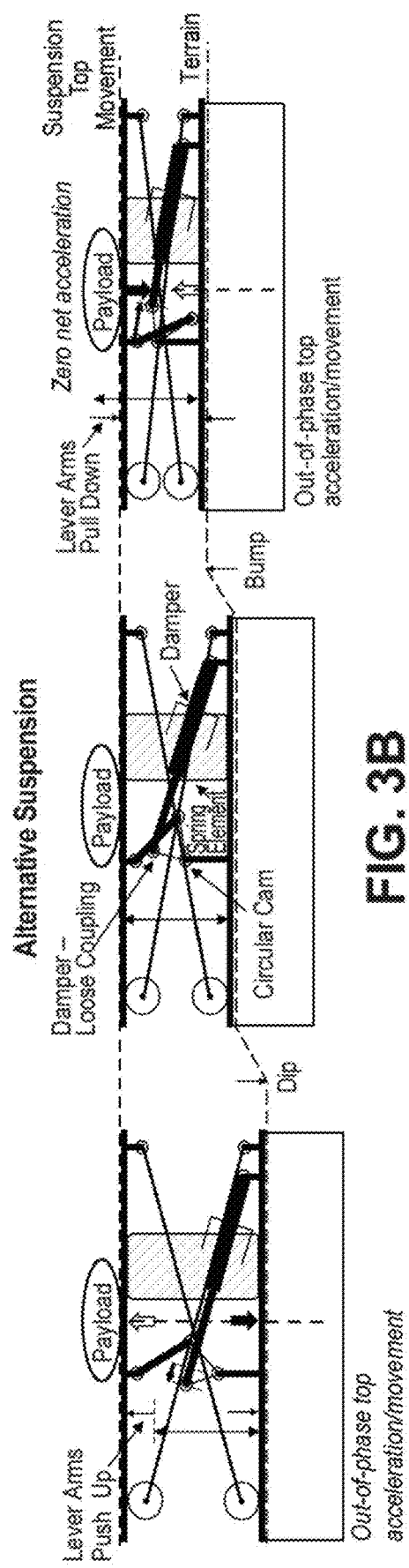
Figure 3C:
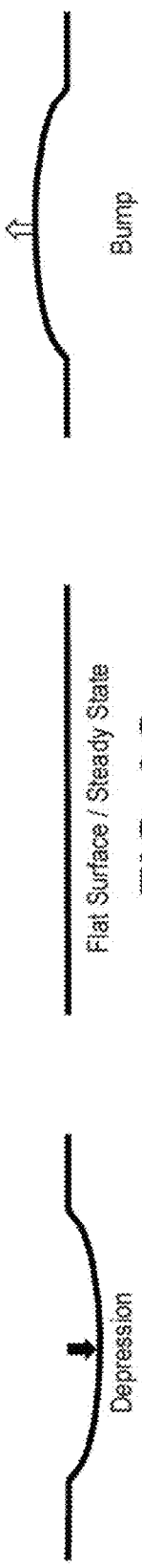

As shown in the leftmost images of FIGS. 3A-3C, when a suspension system travels over a depression, a downward acceleration is created (thick solid black arrow). With a conventional suspension system, when travelling over a depression, the base of the conventional suspension system will move downward and in unison with the terrain causing a downward acceleration (larger/longer thick black downward arrow in left image of FIG. 3A), and the spring and damper element(s) will elongate to absorb some of the downward acceleration (damper movement indicated by the short, parallel, nearly vertical dashed lines in the left image in FIG. 3A). But the spring and damper elements, due to their attachment to the suspension element(s) in the conventional suspension system, cannot work independently, and together they pull the top of the conventional suspension system downward when travelling over the depression (height difference in the dashed line between the left and middle images of FIG. 3A).

The end result, when travelling over the depression, is that the top of the conventional suspension system also moves downward and nearly in-phase and in unison with the base of the conventional suspension system. The dashed line that extends across the left, middle, and right images of FIG. 3A shows the movement of the top of the conventional suspension system. Using the dashed line to compare the top of the conventional suspension system before encountering the depression (middle image of FIG. 3A) to the top of the conventional suspension system when travelling over the depression (left image of FIG. 3A), the top of the conventional suspension system is slightly lower when travelling over the depression. The lower height of the top of the conventional suspension system when travelling over the depression (left image of FIG. 3A), relative to the top height of conventional suspension system before the depression (middle image of FIG. 3A), means that some residual downward acceleration remains at the top of the conventional suspension system (shorter thick black arrow, left image of FIG. 3A), and that this remaining/residual acceleration is experienced by the payload (gray oval, FIG. 3A) that rests on top of the conventional suspension system.

As shown in the rightmost images of FIGS. 3A-3C, when a suspension system travels over a bump, an upward acceleration is created (thick gray arrow). With a conventional suspension system, when travelling over a bump, the base of the conventional suspension system will move upward and in phase and in unison as a result of the upward acceleration (note the thin, upward-pointing arrow in right image of FIG. 3A indicating an amount of upward vertical displacement caused by the bump). The spring and damper element(s) in the conventional suspension system cannot work independently, due to being tied to the suspension element or elements, and will work in parallel and will shorten to absorb some of the acceleration (damper movement indicated by the short, parallel nearly vertical, dashed lines in the right image of FIG. 3A). But the spring and damper element or elements, due to their rigid attachment in the suspension system, also pushes the top of the suspension system up when going over the bump (right image of FIG. 3A).

The end result, when travelling over the bump, is that the top of the conventional suspension systems also moves upward and nearly in-phase and in unison with the base of the conventional suspension system (right image of FIG. 3A). Using the dashed line to compare the top of the conventional suspension system before encountering the bump (middle image of FIG. 3A) to the top of the conventional suspension system when travelling over the bump (right image of FIG. 3A), the top of the conventional suspension system is slightly higher when going over the bump. The higher suspension top height when going over the bump means that some residual upward acceleration remains at the top of the conventional suspension system (smaller thick grey arrow in the right image of FIG. 3A) and that this remaining/residual acceleration is experienced by the payload (gray oval, FIG. 3A) that rests on top of the conventional suspension system.

Alternatives to the rigid coupling of the spring element(s) and linear or curvilinear coupling of the coarse, mechanical damping element(s) to the suspension element(s) in conventional suspension systems (FIG. 1 and FIG. 3A) are disclosed. As shown in FIG. 2 and FIG. 3B, the suspension system geometry may be altered. Loose coupling of the spring element(s) may be included. The coarse mechanical damping element(s) may be loosely coupled in a non-rigid and/or non-linear manner. A mechanical assembly comprising three lever arms may be used. In such a suspension system design, with spring and damping elements loosely coupled to the mechanical assembly via three lever arms, the movement of the top of the alternative suspension system can be altered and move differently than the top of a conventional suspension system.

In addition, as shown in FIG. 3B and the left side and light shaded area of FIG. 2, the spring element(s) in the suspension system are not directly tied to any suspension element(s). This contrasts with the conventional suspension system where the spring element(s) are rigidly coupled to the moving suspension element(s) (FIG. 3A and the dark shaded area in left center of FIG. 1). As shown in FIG. 4B, a desirable outcome of the spring element(s) not being tied to the moving suspension element(s) is a large reduction (in some cases, at least a 20-fold reduction) in the spring- and damper-related friction due to the spring and damper elements not being directly coupled to the suspension element(s). This large reduction in friction facilitates the alternative suspension system's ability to attenuate moderate to higher frequency movements and vibrations.

Additionally, as shown in FIG. 3B and the left side and light shaded area of FIG. 2, the spring and damping elements in the alternative suspension system are loosely coupled to the cam and interconnected lever arm system and are not tied to any suspension element(s). This contrasts with the conventional suspension system where the spring and damping elements are tied together, rigidly coupled to the moving suspension element(s), and cannot work independently but must work together in parallel (FIG. 1 and FIG. 3A). As shown in FIG. 4B, a desirable outcome of the spring and damping element(s) being loosely coupled to one another, and not directly tied to the independent moving suspension element(s), is a large reduction (in some cases, at least a 20-fold reduction) in the friction imparted on the independent moving suspension element(s). This friction reduction will facilitate the alternative suspension system's ability to attenuate both lower velocity random vibrations and movements, as well as moderate to higher frequency movements and vibrations.

In addition, by altering the geometry of the cam and lever arms in the alternative suspension system, the movement of the top of the suspension system can be altered from moving in unison and in phase with the bottom of the suspension system like a conventional suspension system, to a range of different movement patterns. In one alteration of the movement patterns, the movement of the top of the suspension system is altered to move predominantly out of phase (~150 to 180 degrees) and opposite to the direction of the movement of the base of the suspension system. This latter movement, where the top of the suspension system moves in the opposite direction of the top of a conventional suspension system, and also opposite to the movement of the base of the suspension system, will be referred to as the acceleration, vibration, and movement mitigating/cancelling mode. This unique acceleration, vibration, and movement mitigating/cancelling mode of the alternative suspension system will now be described in further detail.

As shown in the left image of FIG. 3B, when the suspension system travels over a depression, a downward acceleration is created (black thick downward arrow in left image of FIG. 3B). Just like the base of the conventional suspension system (the left image of FIG. 3A), the base of the suspension system also moves downward (the left image of FIG. 3B) and is exposed to and experiences the downward acceleration (black thick downward arrow in the left side of FIG. 3B). Similar to the damper element(s) in the conventional suspension system, the damper element(s) in the suspension elongate to absorb some of the downward acceleration (damper movement from the neutral height, steady state condition is indicated by the short, parallel, vertically aligned dashed lines in the left image of FIG. 3B). However, in contrast to the conventional suspension system (FIG. 3A), the damper in the new suspension system (FIG. 3B) is loosely coupled (e.g., pivotably coupled at the rotational/circular axis at the terminal end of the damper shown in FIG. 3B) to three interconnected lever arms and a circular cam (the three rotational/circular axes shown in FIG. 3B).

When going over the depression (left image of FIG. 3B), the end result of the damper element(s) being loosely coupled to the three interconnected lever arms and cam is that the top of the suspension system—due to the geometric arrangement of the damping element(s), the three interconnected lever arms, and the cam—moves the top of the suspension system the same amount/distance (upward thick gray arrow, left image of FIG. 3B), but in an opposite direction (upwards), predominantly out of phase (~150 to 180 degrees) with the movement of the suspension system base (downward thick black arrow, left image, FIG. 3B). This contrasts with the top of the conventional suspension systems which moves downward, and nearly in-phase and in unison with the base of the conventional suspension system (smaller, shorter thick black downward arrow, left image of FIG. 3A). As shown in the performance diagram of FIG. 5B, this out of phase movement of the top of the suspension predominantly occurs between 3 to 12 Hz for a suspension system in accordance with embodiments of the present disclosure. This is one of the two acceleration, vibration, and movement cancelling modalities of the suspension system, when travelling over depressions and subjected to downward movements.

In addition, due to the geometric arrangement of the loosely coupled damping element(s), the interconnected lever arms and the cam/shaft arrangement (e.g., of the mechanical assembly 105), when travelling over depressions (left image in FIG. 3B), this cam and lever arm system can push up on the top of the suspension system, and create an upward acceleration at the top of the suspension system (large gray upward arrow, left image of FIG. 3B) roughly equal and opposite to the downward acceleration created at the bottom of the suspension system (large thick black downward arrow in left image of FIG. 3B). In some cases, this may be due to the weight associated with a vehicle's mass pulling down on the base of the suspension system; this force may act on and cause counterclockwise (as viewed in FIG. 3B) rotation of the cam and lever arm system (e.g., the mechanical assembly), which may result in an upward force of the lever arms pushing up on the top portion of the suspension system, for example. If the movement of the top of the suspension system is roughly equal and opposite to the movement of the bottom of the suspension system (left image of FIG. 3B), and the height of the top of the suspension system is roughly equal to the height of the suspension system when in its steady state before encountering the depression (dashed line across left and middle images of FIG. 3B), then the accelerations at the top and bottom of the suspension system roughly cancel out, and the payload at the top of the suspension system (gray oval in left image of FIG. 3B) receives/experiences little to no acceleration, vibration, and/or movement. This is the first form of the two acceleration, vibration, and movement cancelling modalities, when the suspension system is subjected to downward accelerations and movements.

Additionally, as shown in the right images of FIGS. 3A and 3B, when the corresponding suspension system travels over a bump, an upward acceleration is created (thick gray arrows, right images of FIGS. 3A and 3B). Just like the base of the conventional suspension system (right image of FIG. 3A), the base of the new suspension system also moves upward (right image of FIG. 3B) and is exposed to/experiences an upward acceleration (thick gray upward arrows in the right images of FIGS. 3A and 3B). Similar to the shortening of the rigidly connected damper element(s) in the conventional suspension system (right image FIG. 3A), in the alternative suspension system, the loosely coupled damper element(s), connected to the cam and three lever arms, also shorten (indicated by the nearly horizontally-directed arrow in the right image of FIG. 3B) to absorb some of the upward acceleration.

Figure 5B:
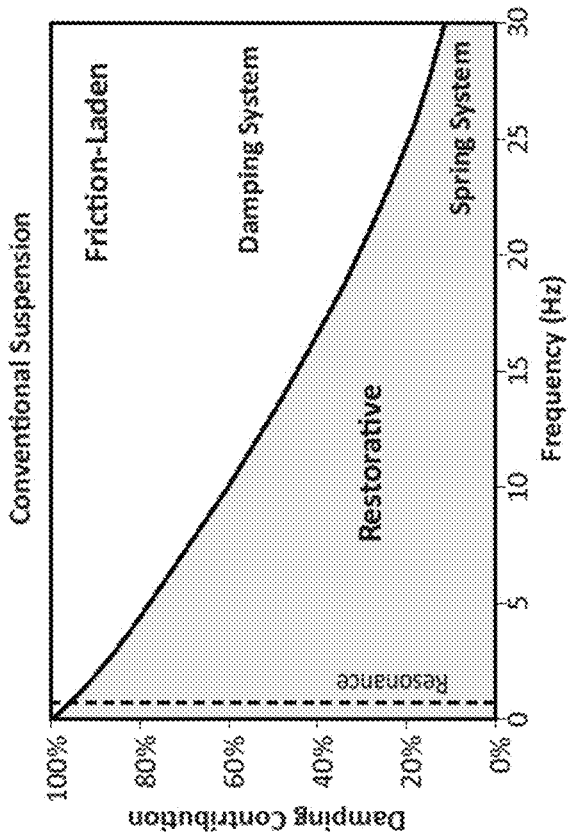

However, relative to the steady state of the conventional suspension system (middle image of FIG. 3A), when travelling over the bump, the top of the conventional suspension systems moves upward (height of the top of the suspension in the right image of FIG. 3A relative to the middle image of FIG. 3A), and nearly in-phase and in unison with the base of the conventional suspension system (right image of FIG. 3A). In contrast, the top of the new suspension system, due to the geometric arrangement and loose coupling of the damping element(s) to the cam and three lever arms, moves downwards by the same amount/distance (right image of FIG. 3B) but in an opposite direction (downwards) and predominantly out of phase (~150 to 180 degrees) with the movement of the bottom of the suspension system (right image of FIG. 3B). As shown in FIG. 5B, this out of phase movement of the top of the suspension predominantly occurs between 3 to 20 Hz. This is the second of the two acceleration, vibration, and movement cancelling modalities, when the suspension system is subjected to bumps and upward accelerations and movements.

In addition, due to the geometric arrangement of the loosely coupled damping element(s) to the cam and three lever arms, this cam and lever arm system can pull down on the top of the suspension system, and a roughly equal and opposite downward acceleration can be created and applied to the top of the suspension system (thick black arrow, right image of FIG. 3B). If the movement of the top of the suspension is roughly equal and opposite to the bottom of the suspension system (thin upward and downward pointing arrows in the right image of FIG. 3B), and the height of the top of the suspension system is roughly equal to the height of the suspension system when in its steady state before encountering the depression (dashed line across middle and right images of FIG. 3B), then the accelerations at the top and bottom of the suspension system cancel out and the payload at the top of the suspension system (gray oval, right image of FIG. 3B) receives/experiences no acceleration or movement. This is the second of the two acceleration, vibration, and movement cancelling modalities, when the suspension system is subjected to upward acceleration and movements when travelling over bumps.

As shown in FIG. 2, FIG. 3B, and FIG. 4B, another beneficial outcome of the new suspension system design, due to the spring and damping element(s) not being rigidly tied together and not being directly tied to the suspension element(s) is that the spring and damper element(s) can work differentially and relatively independently of one another in a pseudo-serial fashion at the high and low frequency extremes, and together and in parallel at intermediate frequencies. As a result, as shown in the performance diagram of the suspension system in FIG. 5B, at the lowest and highest frequencies, the spring and damper element(s) can work semi-independently or differentially from of one another. Then, going from the intermediate to higher frequencies (~4 to 20 Hz), the contribution from the spring element(s), which predominantly supply movement mitigation, reduces their contribution and work in parallel to the damping element(s) to provide both movement and vibration mitigation. At the higher frequencies (~>20 Hz), the damper element(s) predominate and provide the majority of the higher frequency vibration mitigation. At the lower frequencies (~<4 Hz) and down to suspension system's resonance (2 Hz in this example), which includes the lower frequency shocks and jolts, the velocity-based damper in the conventional suspension system is differentially engaged to provide additional low frequency acceleration mitigation. Finally, at frequencies below the suspension system's resonance, the suspension system's top and bottom move in unison or in phase, and both the spring and damper element(s) provide little to no acceleration or movement mitigation.

In contrast, as shown in FIG. 1, FIG. 3A, and FIG. 4A, with the conventional suspension system design, due to the spring and damping element(s) being rigidly tied together and directly tied to the suspension element(s), the spring and damper element(s) cannot work independently or differentially from of one another and must work together and in parallel across all frequencies. As a result, as shown in the performance diagram of the conventional suspension system in FIG. 5A, the spring and damping element(s) cannot work independently from one another, and the differential performance and contribution from the spring and damping element(s) is limited. The lack of differential contribution and independence negatively affects the conventional suspension performance at intermediate to higher frequencies (~4 to ~20 Hz). At the lower frequencies (~<4 Hz) and down to the conventional suspension system's resonance (2 Hz in this example), which includes the lower frequency shocks and jolts, the velocity-based damper is not as differentially engaged as in the suspension system and does not provide the same additional, differential low frequency acceleration mitigation. Finally, at frequencies below the conventional suspension system's resonance, the conventional suspension system's top and bottom move in unison or in phase and both the spring and damper element(s) provide little to no acceleration or movement mitigation.

FIG. 6A shows a conventional suspension (top left image) that has a constant damping rate (constant slope) and linear damping (force output) with suspension height based on a collapsing right triangle and/or a triangular damping geometry. FIG. 6B shows a suspension apparatus 100 in accordance with the present disclosure (bottom left image) that has a variable damping rate (e.g., variable slopes) and non-linear damping (force output) that varies with suspension height (based on the circular geometry according to the present disclosure) in addition to varying with velocity.

Figure 6C:
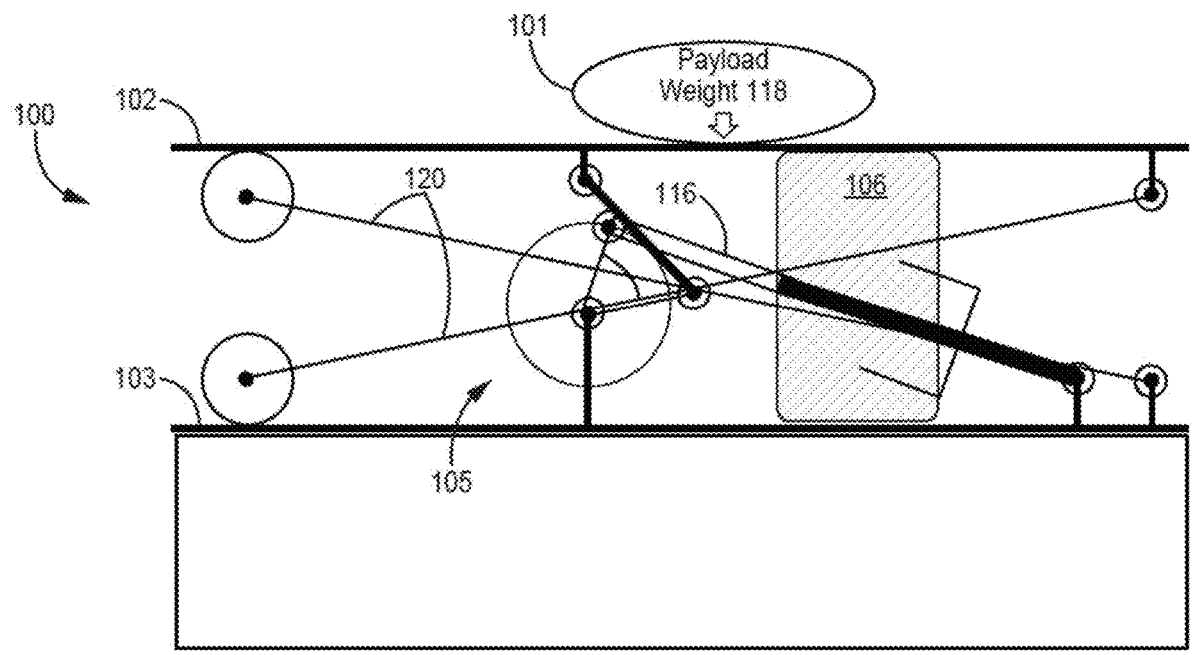
FIGS. 6C and 6D are schematic representations of a mechanical assembly and fine suspension device configured to provide variable damping to a suspension apparatus in accordance with embodiments of the present disclosure.
Figure 6D:
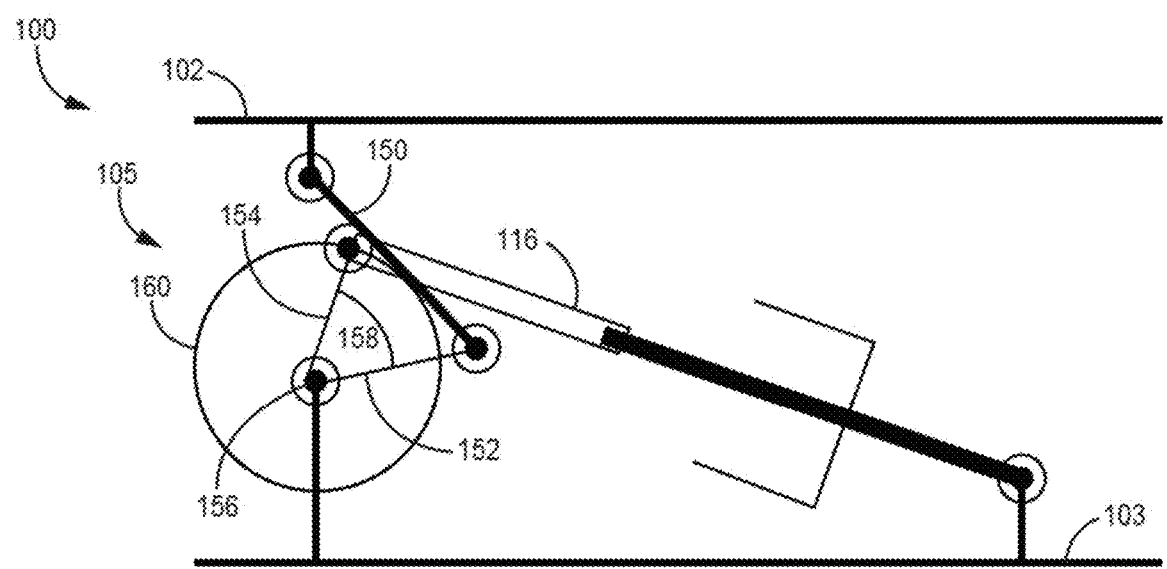

FIGS. 6C and 6D are horizontal cross-sectional views of the suspension apparatus 100 of FIG. 6B, showing certain portions of suspension apparatus 100 in more detail. For example, mechanical assembly 105 is shown in FIG. 6C relative to other components, such as fine suspension device 116, coarse suspension device 106, base frame 103, supporting frame 102, and two crossed arms forming scissor linkage 120, for example. FIG. 6D is an enlarged view, showing further details of mechanical assembly 105 and its operable coupling with fine suspension device 116, according to certain embodiments. (Coarse suspension device 106 has been removed from FIG. 6D to show more details of the mechanical assembly 105.) FIG. 6D shows mechanical assembly 105 comprising a two-arm vertical linkage that includes an upper link arm 150, and a lower link arm 152 pivotably coupled together. In turn, upper link arm 150 is pivotably coupled to supported frame 102, and lower link arm 152 is pivotably coupled to base frame 103, substantially as shown in FIG. 6D. The mechanical assembly 105 further comprises a lever arm 154 having a first end coupled to an end of the two-arm vertical linkage. For example, the first end of lever arm 154 is coupled to the end of the lower link arm 152 at a cam or shaft 156 configured to rotate about an axis.

The coupling of the first end of lever arm 154 to the end of the lower link arm 152 may occur at the same coupling that pivotably couples the end of the lower link arm 152 to the base frame 103. In some embodiments, this coupling may comprise a rotatable cam or shaft 156 that is configured to rotate about an axis that is generally horizontal in its orientation. The coupling of both the first end of lever arm 154 and the lower link arm 152 to the rotatable cam or shaft 156 may comprise, for example, secure coupling of both the lever arm 154 and the lower link arm 152 to the rotatable cam or shaft 156 such that a fixed angular relationship 158 is maintained between lever arm 154 and lower link arm 152 as they rotate or pivot about the generally horizontal axis of rotation of rotatable cam/shaft 156. This arrangement enables the first end of the lever arm 154 to rotate about a generally horizontal axis in response to movement of the two-arm vertical linkage 150, 152 which is, in turn, caused by relative displacement between the supported frame 102 and the base frame 103 in a generally vertical direction. In some embodiments, the angular relationship maintained between the lever arm 154 and the lower link arm 152 (of the two-arm vertical linkage) comprises an angle between 30 and 90 degrees. In certain embodiments, the angle maintained between the lever arm 154 and the end of the two-arm vertical linkage (e.g., the lower link arm 152) is approximately 60 degrees.

The lever arm 154 also has a second end configured to be coupled to the fine suspension device 116. The coupling of the lever arm 154 to the fine suspension device 116 may, for example, provide the mechanism by which the mechanical assembly 105 converts relative vertical displacement between the base frame 103 and the supported frame 102 into a horizontal displacement. As shown in FIG. 6D, rotation of the first end of lever arm 154 about rotatable cam 156 can result in movement of the second end of lever arm 154 in a generally horizontal direction (e.g., left to right and vice versa). The movement of the second end of lever arm 154, which may be coupled to fine suspension device 116, is along an arc that is part of a circular path of rotation 160. However, as shown in FIG. 6D, the movement of the second end of lever arm 154 is configured to be along an arc that has a substantially horizontal displacement component during operation of suspension apparatus 100. In some embodiments, lever arm 154 may be configured to rotate from roughly a 7 O'clock position to roughly a 5 O'clock position over its operating range of rotation, for example, corresponding to a maximum height and a minimum height, respectively, of the displacement between the base frame 103 and the supported frame 102. Described alternately, the range of rotation of lever arm 154 may span 300 to 330 degrees of relative rotation corresponding to the maximum height and the minimum height of the displacement between the base frame 103 and the supported frame 102. Fine suspension device 116 is coupled to the second end of lever arm 154 to provide damping to the generally horizontal displacement of the second end of lever arm 154 being coupled to the fine suspension device 116. In some embodiments, fine suspension device 116 may be pivotably coupled to the base frame 103 at an opposite end of the fine suspension device 116 from where it is coupled to the second end of lever arm 154. In alternate embodiments, fine suspension device 116 may be pivotably coupled to the supported frame 102 at an opposite end of the fine suspension device 116 from where it is coupled to the second end of lever arm 154.

It should be noted that suitable modification may be made to the embodiment explained above with respect to FIG. 6D. For example, the diameter of the circular path of rotation 160 may be altered by changing the length of lever arm 154, for example. Similarly, various modifications to the angles and lengths shown could be made to the mechanical assembly 105, including to the cam/shaft 156, the upper and lower link arms 150, 152, and to the lever arm 154, which may function to alter the phase, magnitude, and frequency of the accelerations, vibrations, and movements which are absorbed by the suspension apparatus 100 and/or transferred to the payload. Modifying the diameters, angles, and lengths of the components of the mechanical assembly 105 may be referred to herein as altering the cam geometry.

First, the suspension apparatus 100 cam geometry may be altered to change the phase with which the payload moves relative to the input accelerations, vibrations, and movements. The cam geometry can be altered so the payload moves in-phase/unison with the input accelerations, vibrations, and movements, like a conventional suspension system, to moving completely out-of-phase/opposite with the input accelerations, vibrations, and movements. The cam geometry promoting in-phase/unison movement can be desirable to cause the payload to move in-phase/unison with longer, lower frequency slow accelerations, vibrations, and movements. The cam geometry promoting out-of-phase/opposite movement can be desirable to cause the payload to move out-of-phase/opposite to shorter, lower to intermediate frequency transient accelerations and movements.

Second, the suspension apparatus 100 cam geometry, spring element(s), damping element(s), and an optional external air tank (not shown) can be altered to change the magnitude/amount that the accelerations, vibrations, and movements are either mitigated or amplified.

Third, the suspension apparatus 100 cam geometry, spring elements(s), damping element(s), and an optional external air tank can be altered to change the range of frequencies and center (most effective) frequency that the accelerations, vibrations, and movements are either mitigated or amplified.

A suspension apparatus 100 according to some embodiments of this disclosure may operate such that a displacement of the base frame 103 in a generally vertical direction causes a displacement of (or force to) the supported frame 102 in a direction generally opposite to that of the displacement or force of the base frame 103. In some embodiments, the resulting displacement of the supported frame 102 may be approximately equal in magnitude to the displacement of the base frame 103. In some embodiments, the fine suspension device 116 is configured to provide a horizontal damping force in response to a first force that is applied to the base frame 103 in a generally vertical direction. In turn, the mechanical assembly 105 may be operably coupled to the fine suspension device 116 and configured to convert the horizontal damping force into a second force that is applied to the supported frame 102 in a generally vertical direction that is opposite to the direction of the first force applied to the base frame 103. This may result in an out-of-phase response to input forces that may be desirable according to various embodiments. For example, the aforementioned second force applied to the supported frame 102 may be generally out of phase with the first force applied to the base frame 103. It should be noted that, in some alternate embodiments, it may be the supported frame 102 that is exposed to the first force, and the resultant second force may be applied to the base frame 103, for example, by reversing the arrangement and/or coupling of the mechanical assembly 105 and the fine suspension device 116 with respect to the base frame 103 and the supported frame 102. In some embodiments, the mechanical assembly 105 and/or the fine suspension device 116 may couple the base frame 103 to the supported frame 102 without being coupled to the scissor linkage 120. This may result in a significant reduction in friction of the suspension apparatus 100, as noted above.

Figure 7:
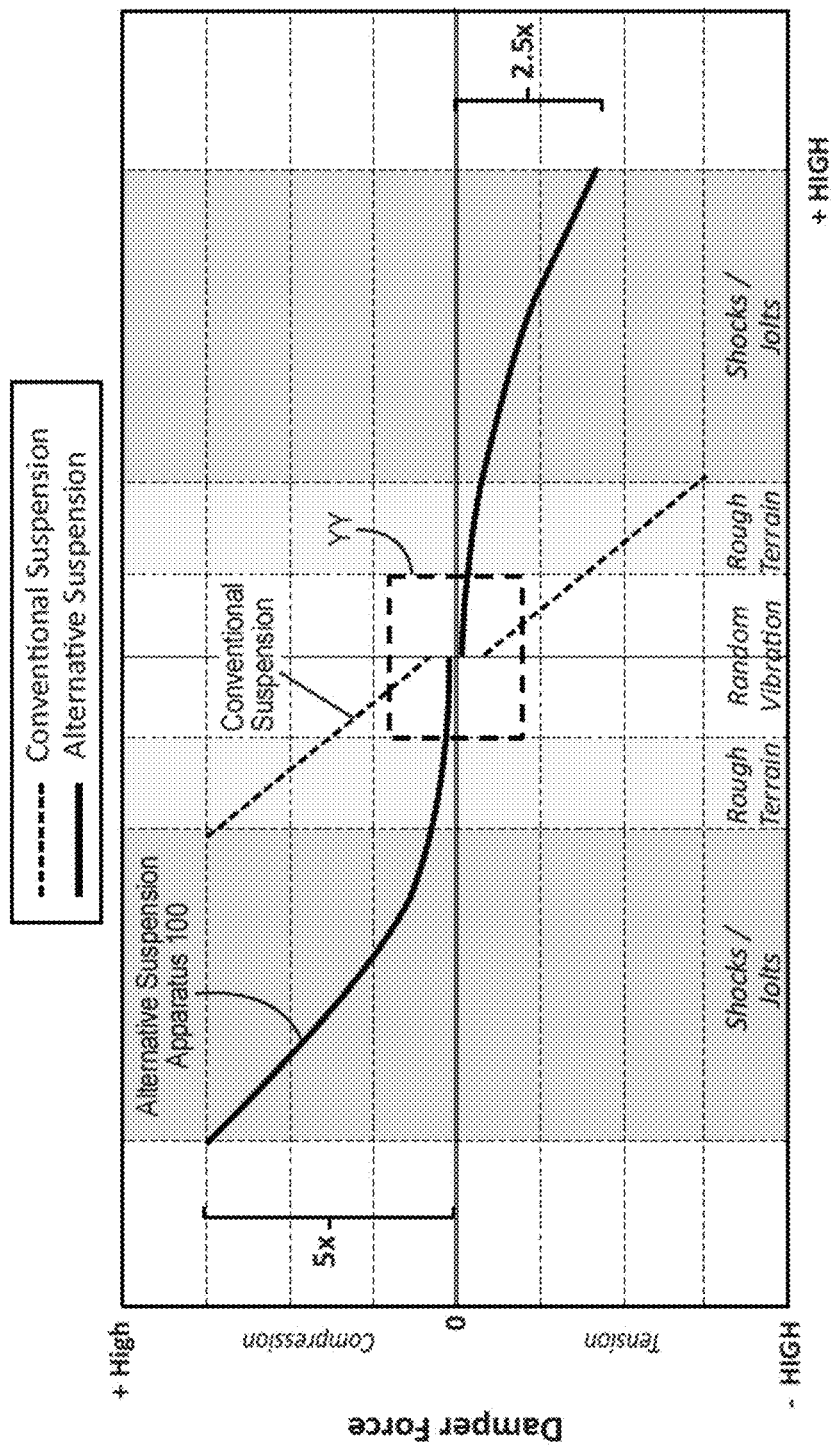
FIG. 7 shows plots of damper force versus damper velocity for (a) a conventional suspension apparatus (thin grey straight lines) having a constant damping rate (constant slope) and linear damping (force output) which increases linearly as velocity increases; and for (b) a suspension apparatus in accordance with embodiments of the present disclosure (bold black curved lines) that has a variable damping rate (variable slope) and non-linear damping (force output) which increases as velocity increases.

FIG. 7 includes a plot of damper force versus damper velocity for a conventional suspension system (thin grey plotted lines) that has a constant damping rate (constant slope) and linear damping (force output), which increases linearly as velocity increases (in either direction). Also shown in FIG. 7 is a corresponding plot of damper force versus damper velocity for a suspension apparatus 100 in accordance with the present disclosure (bold black plotted lines) that has a variable damping rate (variable slope) and non-linear damping (force output) which increases as velocity increases (in either direction).

The light grey line(s) plotted in FIG. 7 shows the damping characteristics of the conventional suspension system are constant (e.g., having a fixed, linear slope) and the slope does not change with the different velocities the suspension can be exposed to during normal operation. In addition, with the conventional suspension, the damping rate (e.g., slope of the line) is the same when the suspension is in compression/collapsing/moving downward with the force of gravity as it is when the suspension is in tension/expanding/moving upward against the force of gravity. In contrast, the bold black line in FIG. 7 shows that the damping characteristics of the alternative suspension 100 are non-linear as the suspension apparatus is exposed to higher velocities during normal operation. In addition, with the alternative suspension system 100, the amount of damping (e.g., slope of the line) may become greater when the suspension is in compression/collapsing/moving down with gravity than it does when the suspension is in tension/expanding/moving up against gravity (e.g., for a given magnitude of damper velocity) due to the effect of downward gravity being applied which resists the upward movement of the alternative suspension system and payload.

Figure 8A:
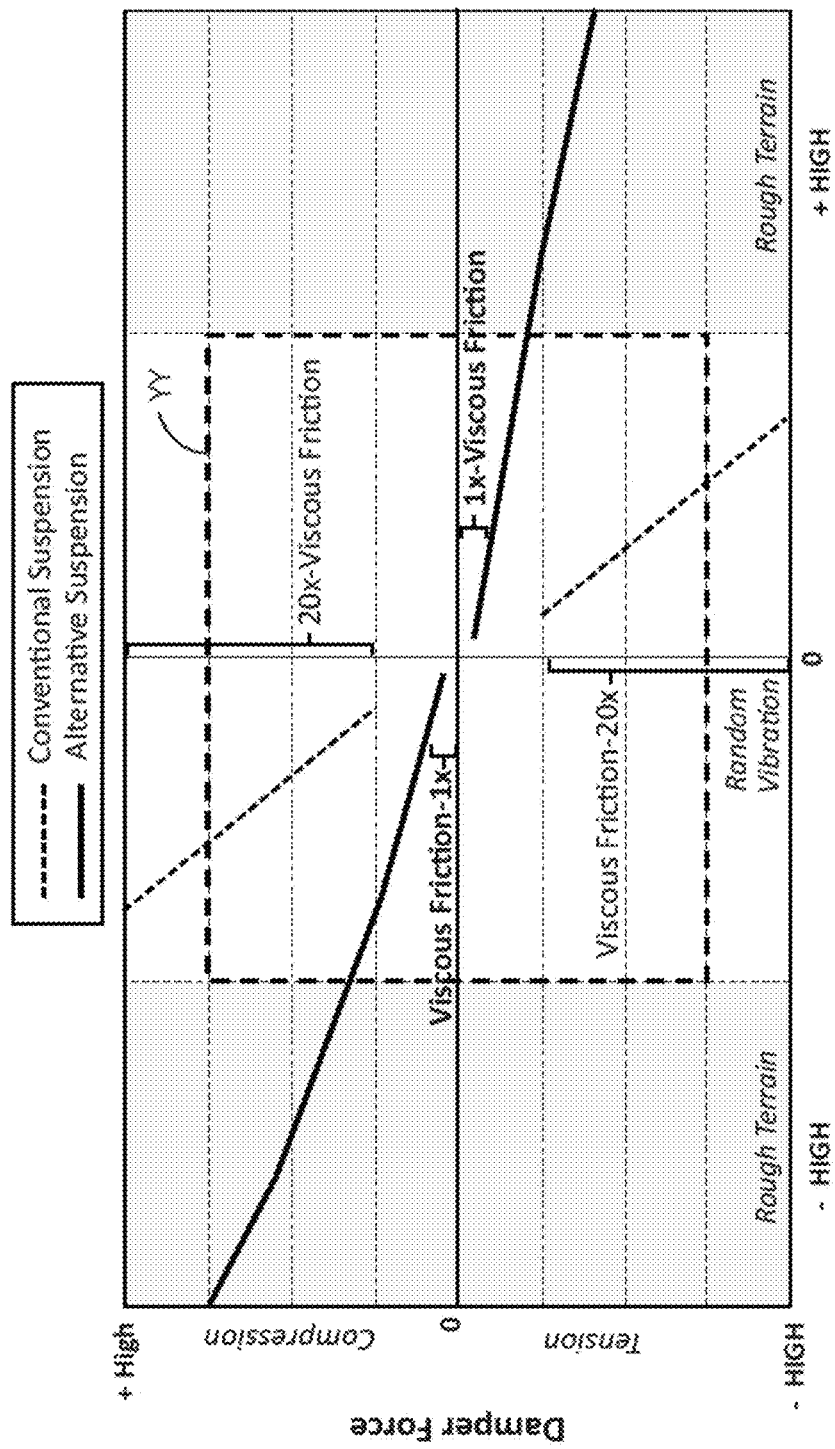
FIGS. 8A and 8B are enlarged images of portions of the plot from FIG. 7 (dashed inset of FIG. 7) showing the damper force response to random vibration conditions when the damper velocities are relatively low with a suspension apparatus in accordance with embodiments of the present disclosure.
Figure 8B:
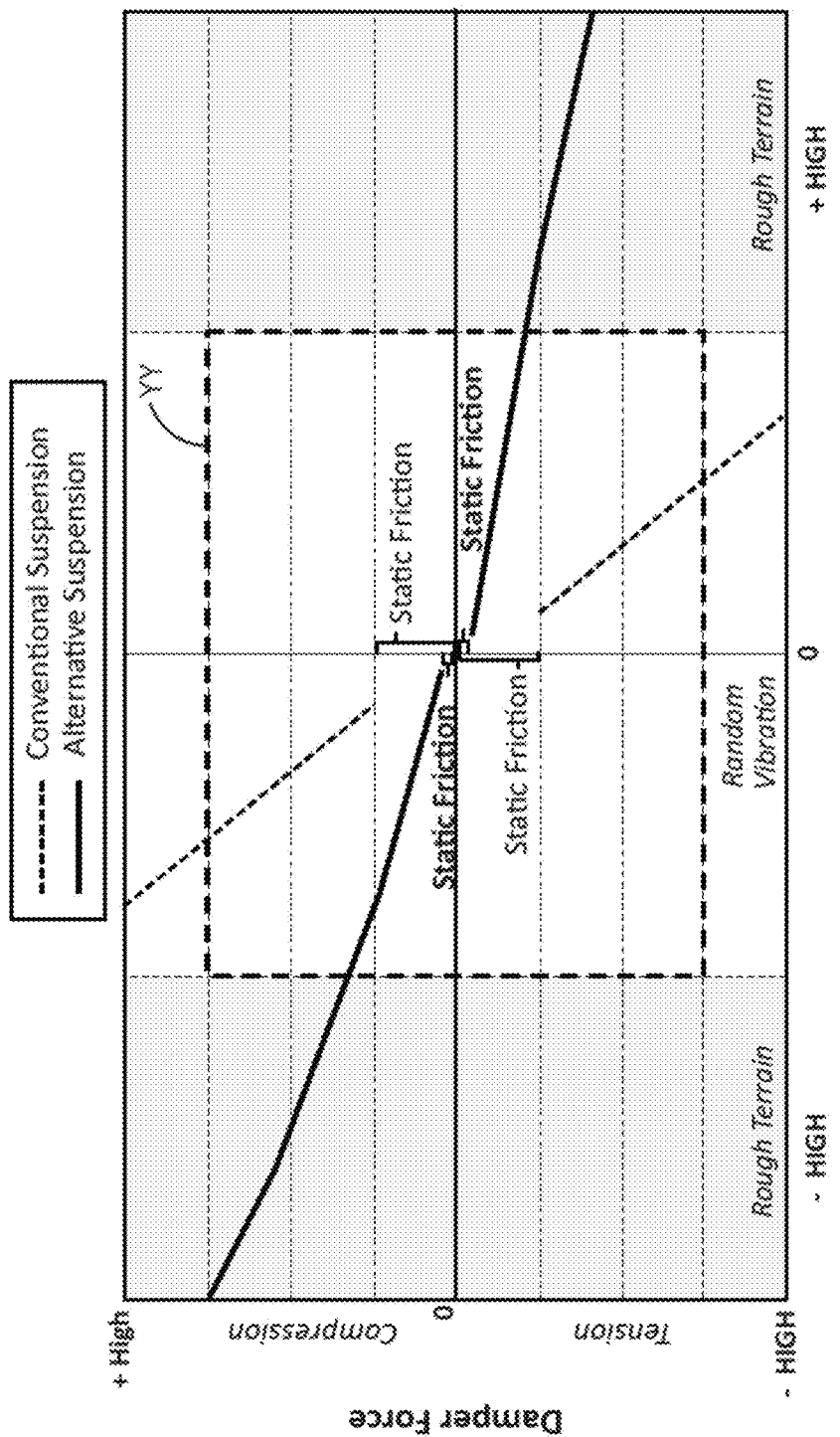

FIGS. 8A and 8B are enlarged plots showing the central portion of the plot from FIG. 7 (corresponding to the dashed inset labeled "YY" in FIG. 7) under random vibration conditions when the damper velocities are relatively low. In accordance with the present disclosure, the effective damping of the alternative suspension apparatus (bold black lines) is significantly lower than the damping of a conventional suspension (thin grey lines) over the range of velocities shown in FIGS. 8A and 8B (e.g., over a range of relatively low velocities). This reduction in damping at low velocities reduces the amount of friction (e.g., viscous friction, as shown in FIG. 8A, and static friction, as shown in FIG. 8B), and thereby improves suspension performance. FIGS. 8A and 8B separately plot the contributions of viscous friction and static friction to overall friction, respectively. Viscous friction, as depicted in FIG. 8A, for example, may correspond to damper slope during motion of a damping element, while static friction, as depicted in FIG. 8B, may correspond to the amount of damper resistance that must be overcome at zero to low velocities.

Figure 9A:
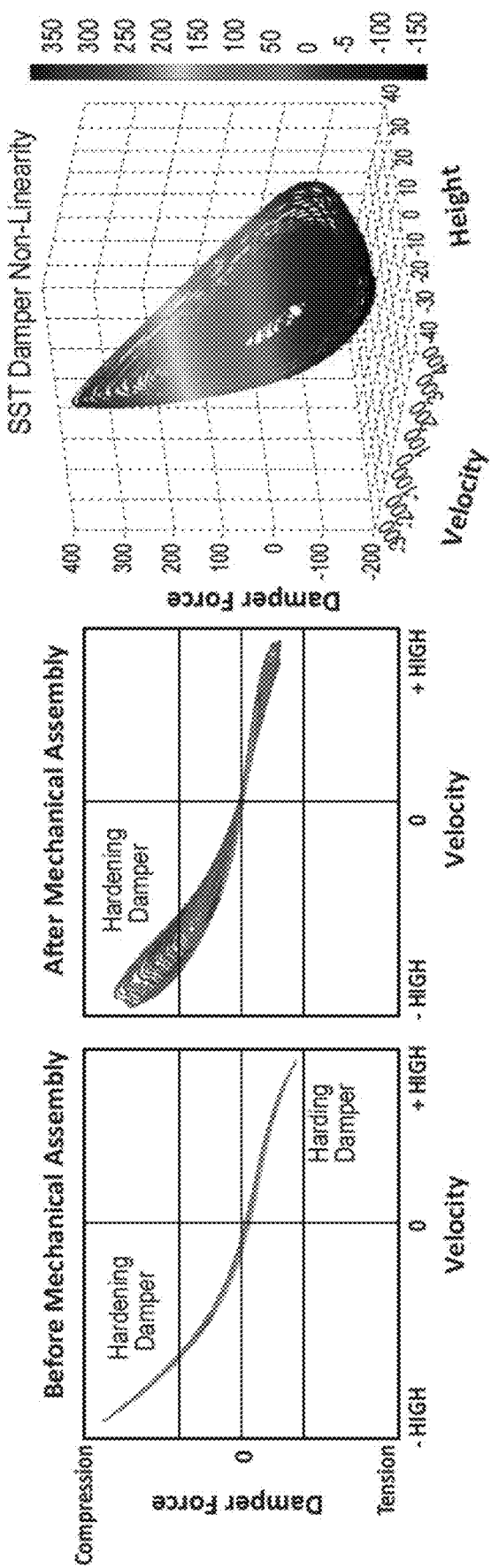
FIGS. 9A-9C are illustrations of the complex damping behavior of a suspension apparatus in accordance with embodiments of the present disclosure, showing damper force varying as a function of both velocity and height.
Figure 9B:
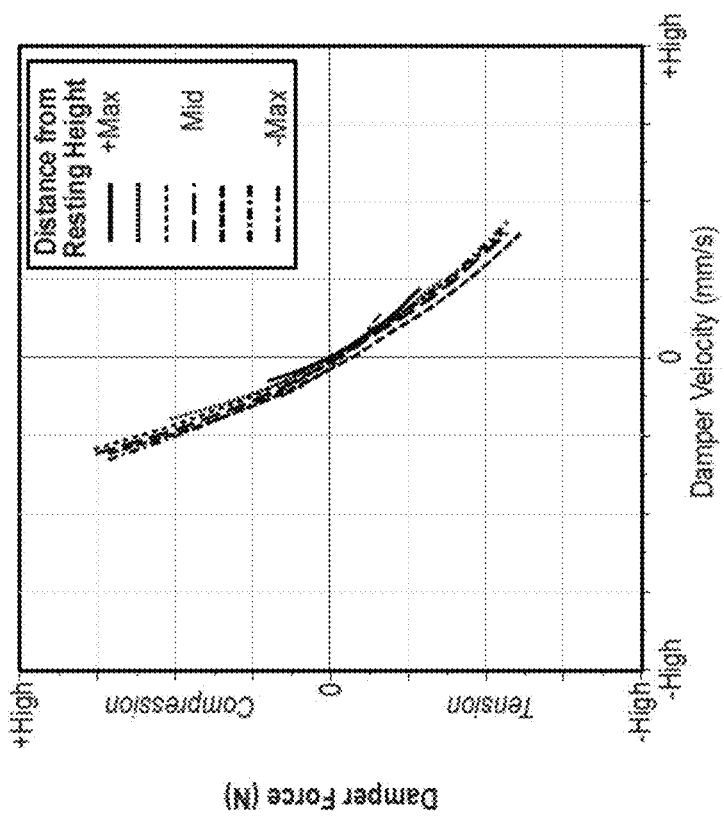
Figure 9B:
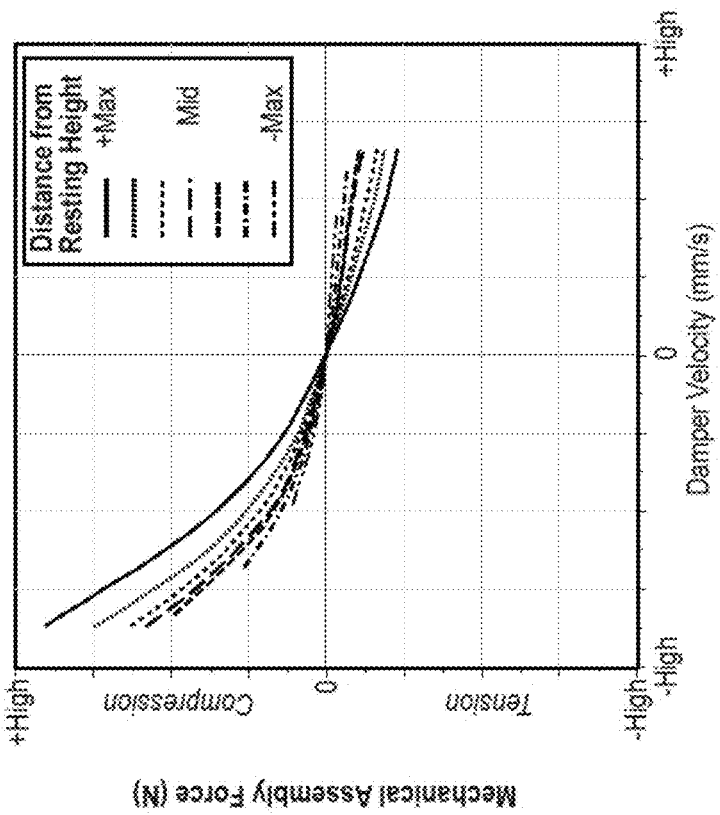
Figure 9C:
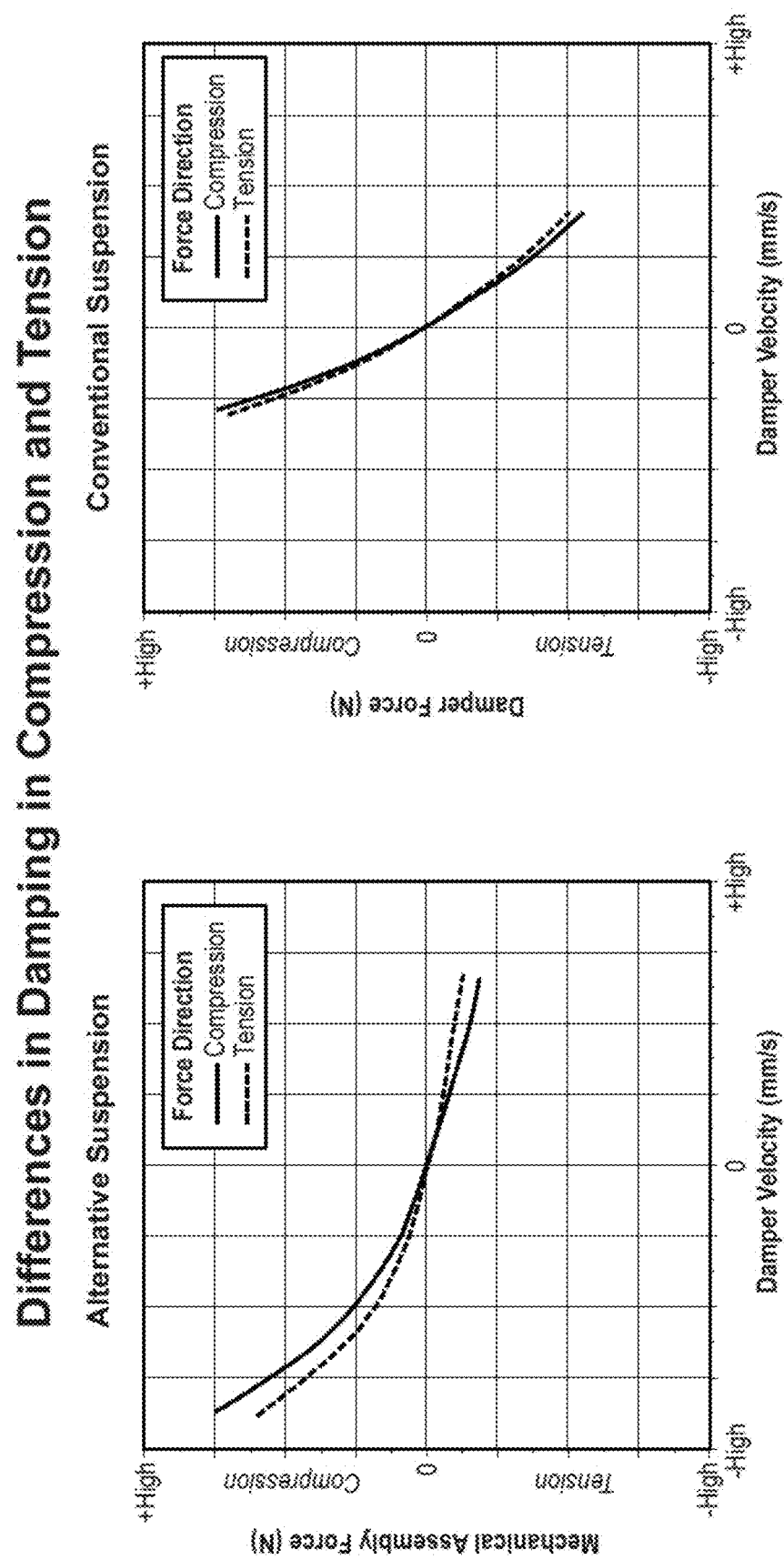

FIGS. 9A-9C illustrate the complex damping behavior of a suspension apparatus 100 in accordance with this disclosure. The left portion of FIG. 9A (labeled "Before Mechanical Assembly") shows a plot of the damper force as a function of damper velocity, measured at the end of the fine suspension device 116. The middle portion of FIG. 9A (labeled "After Mechanical Assembly") shows a plurality of plots of the damper force as a function of damper velocity and as a function of suspension height (e.g., vertical displacement between the base frame 103 and the supported frame 102) when modified by coupling with the mechanical assembly 105. The right portion of FIG. 9A is a three-dimensional plot of the damping force created by suspension apparatus 100, which is dependent on several factors: 1) the velocity of the suspension in either compression/closing or tension/expanding, and 2) the orientation of the mechanical assembly 105 and lever arms 150, 152, and 154, which in turn are dependent on the height of the suspension (distance between the base frame 103 and the supported frame 102 of the suspension apparatus 100).

Furthermore, FIG. 9A illustrates the complex damping of the alternative suspension system. The left image in FIG. 9A shows the forces measured at the end of the alternative suspension system's damper (e.g., fine suspension device 116) as a function of velocity before reaching/entering or interacting with the mechanical assembly 105 (e.g., the lever arm and rotating shaft/cam system). The middle image in FIG. 9A shows the damper forces applied to the top of the alternative suspension after going through the mechanical assembly 105 and lever arm system. The end result of the damper going through the mechanical assembly 105 and lever system is a multitude of damping forces which varies as a function of the varying distance between the top and bottom of the alternative suspension system during normal operation. Finally, the right image shows the complex three-dimensional damping of the alternative suspension system which is based on the varying movement velocities between the top and bottom of the alternative suspension and the varying heights between the base frame 103 and the supported frame 102.

FIG. 9B provides a number of overlaid plots of damping forces across a number of different suspension heights as a function of damper velocity for both a conventional suspension system (right plot of FIG. 9B) and for a suspension apparatus 100 in accordance with this disclosure (left plot of FIG. 9B). As shown in FIG. 9B, the conventional suspension has a nearly linear response curve for all suspension heights plotted, all of which have a fairly steep slope, indicating that the rate of damping force applied remains nearly constant. By contrast, for the varying suspension heights plotted, suspension apparatus 100 has a very small slope near the center of the graph (e.g., corresponding to low/small velocities), but has a slope that increases at an increasing rate as the velocity increases, either in compression or tension. This non-linear response results in greatly reduced friction at velocities that correspond to relatively stable conditions, and higher rates of damping at higher velocities to provide better performance under higher loads and forces, for example.

FIG. 9C provides additional details on how alternative suspension apparatus 100 of this disclosure differs from conventional suspension systems under various conditions. For example, the left plot of FIG. 9C shows the non-linear damper force of the alternative suspension apparatus 100 as a function of damper velocity. It should be noted that the plot includes two lines based on the direction of damper movement—one corresponding to the forces when the damper is moving toward compression, the other corresponding to the forces when the damper is moving toward tension. (For example, the damper force may be greatest when the damper is in compression AND moving toward further compression, whereas the damper forces may be lower at the same velocity but moving away from compression or towards tension, etc.) Again, the alternative suspension apparatus 100 has a damping rate (e.g., slope) that is very low at low velocities, and rises in a non-linear manner as the velocity increases (whether in compression or tension); whereas, the conventional suspension has a very linear slope (e.g., near constant damping rate), which is relatively high at all velocities, including at low velocities. It should be noted that the plots shown in FIG. 9C are averages taken across a varying range of suspension heights corresponding to the velocities and directions plotted.

Figure 11:
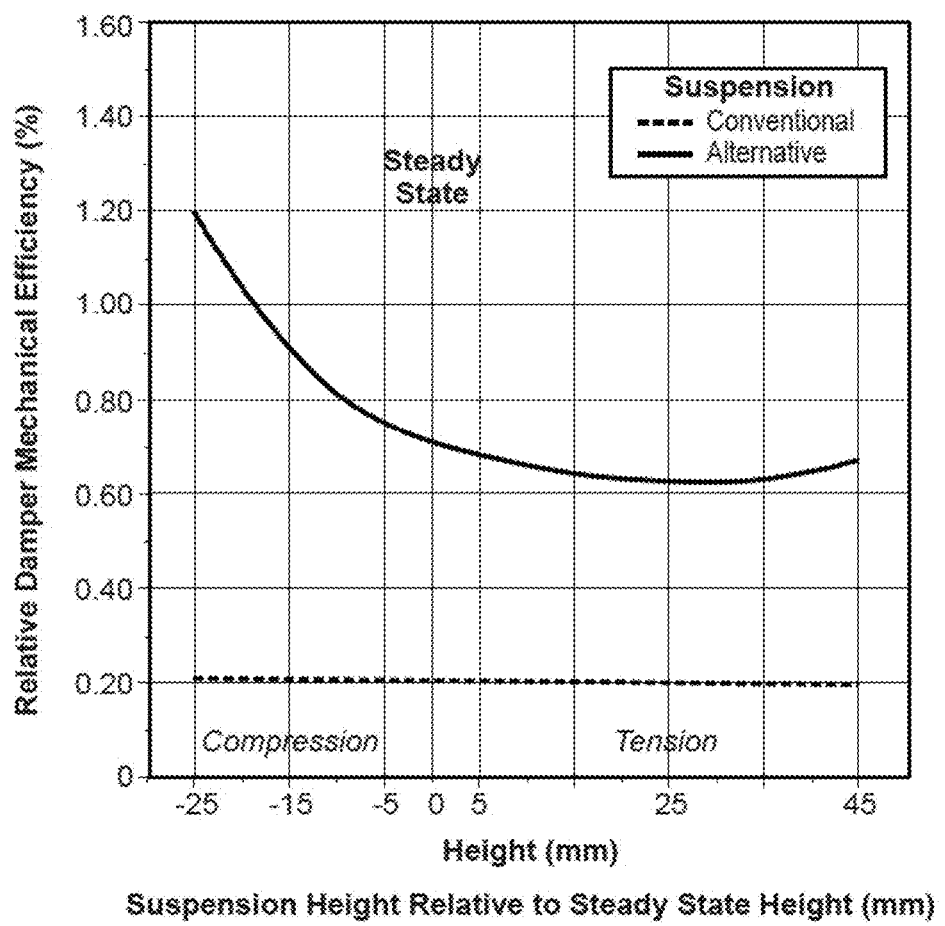
FIG. 11 is a plot of mechanical efficiency as a function of suspension height for both a conventional suspension and a suspension system in accordance with embodiments of this disclosure.

FIG. 11 is a plot of relative mechanical efficiency as a function of suspension height for both a conventional suspension (flat grey line at a level of approximately 0.20) and an alternative suspension system 100 in accordance with some embodiments of this disclosure (black curved line). The relative damper mechanical efficiency curves, which are based on damper velocity, show the vertical force applied by the mechanical assembly 105 (e.g., in the case of the alternative suspension apparatus 100 of this disclosure), or the vertical force emanating from the terminal end of the damper lobe (e.g., in the case of a conventional suspension), relative to the total force (vector sum of vertical and horizontal components) measured at the terminal end of a damper element (e.g., the fine suspension device 116 in the case of the alternative suspension apparatus 100 of this disclosure). Part of the increased mechanical efficiency of the alternative suspension 100 may be due, at least in part, to the greater velocities imparted on the damper element (e.g., fine suspension device 116) in tension and compression by the mechanical assembly 105 of suspension apparatus 100. As can be seen with reference to FIG. 7, for a given damper force, the velocity is higher for the alternative suspension; this increased damper velocity at all forces contributes to the greater mechanical efficiency of the alternative suspension.

With a conventional suspension, only 20% of the total damper force is converted to a vertical force, and the mechanical advantage does not change with the vertical height of the suspension as it operates. By contrast, with the alternative suspension apparatus of this disclosure, between ~60-120% of the total damper force may be converted to a resultant vertical force, and the mechanical advantage varies with the vertical height of the suspension relative to the neutral height or steady-state height.

In some embodiments, the mechanical assembly 105 and fine suspension device 116 of suspension apparatus according to this disclosure may provide a significant mechanical advantage over conventional suspension systems, thereby allowing a damper element (e.g., fine suspension device 116) with much lower damping capacity to be used (e.g., having less viscous and static friction). A suspension apparatus according to some embodiments of this disclosure may provide as much as a 3- to 6-fold mechanical advantage over conventional suspension systems.

FIGS. 12A and 12B are schematic representations and plots showing damper mechanical efficiency plotted as a function of both velocity and suspension height for a conventional suspension (FIG. 12A) and a suspension system in accordance with embodiments of this disclosure (FIG. 12B), respectively. For example, the conventional suspension system depicted schematically in FIG. 12A has a damper mechanical efficiency of roughly 20%, and this does not vary significantly with changes in suspension height, as shown in the plot to the right in FIG. 12A. By contrast, a suspension apparatus according to some embodiments of this disclosure (for example, the system depicted schematically to the left in FIG. 12B) has a damper mechanical efficiency that varies with both damper velocity AND with changes in suspension height, as shown in the plot to the right in FIG. 12B.

Various examples have been described with reference to certain disclosed embodiments. The embodiments are presented for purposes of illustration and not limitation. One skilled in the art will appreciate that various changes, adaptations, and modifications can be made without departing from the scope of the invention.

What is claimed is:

1. A passive suspension apparatus for supporting a payload, the passive suspension apparatus comprising:
a base frame and a supported frame, the supported frame coupled to the base frame, the supported frame configured to be disposed vertically a neutral height above the base frame when a payload having a payload weight is disposed on the supported frame, the passive suspension apparatus configured to support relative displacement in a generally vertical direction between the supported frame and the base frame from a minimum height to a maximum height, the neutral height being between the minimum height and the maximum height, the supported frame being coupled to the base frame via:
a scissor linkage, the scissor linkage comprising two crossed scissor arms pivotably coupled together about a central pivot, each of the two crossed scissor arms extending from the base frame to the supported frame, the two crossed scissor arms being free to rotate relative to each other as the supported frame and the base frame move closer to and farther away from each other;
a coarse suspension device coupling the base frame to the supported frame, the coarse suspension device configured to oppose a relative displacement in the generally vertical direction between the base frame and the supported frame, the coarse suspension device being adjustable to support the payload at the neutral height;
a mechanical assembly configured to convert the relative displacement in the generally vertical direction between the base frame and the supported frame into a generally horizontal displacement; and
a fine suspension device operably coupled to the mechanical assembly to provide damping to the horizontal displacement from the mechanical assembly, the mechanical assembly and the fine suspension device coupling the base frame to the supported frame;
wherein the passive suspension apparatus comprises only passive components,
wherein a force applied to one of the base frame and the supported frame in the generally vertical direction causes a generally opposite force to be applied to the other of the base frame and the supported frame, and
wherein the damping provided by the fine suspension device and the mechanical assembly varies in a non-linear manner such that:
the amount of damping provided in response to the relative displacement in the generally vertical direction between the base frame and the supported frame is different for an upward displacement of a given amount X than for a downward displacement of the given amount X.

2. The suspension apparatus of claim 1 wherein the coarse suspension device is directly coupled to the base frame and to the supported frame.

3. The suspension apparatus of claim 1 wherein the coarse suspension device comprises one or more air springs or mechanical springs.

4. The suspension apparatus of claim 3 wherein the coarse suspension device comprises one or more air springs configured to be adjusted to a different air pressure based on the payload weight and the neutral height.

5. The suspension apparatus of claim 3 wherein the coarse suspension device further comprises one or more blocks.

6. The suspension apparatus of claim 5 wherein the one or more blocks are configured to facilitate adjusting the coarse suspension device to support the payload at the neutral height.

7. The suspension apparatus of claim 1 wherein the neutral height is closer to the maximum height than to the minimum height.

8. The suspension apparatus of claim 1 wherein the neutral height is closer to the minimum height than to the maximum height.

9. The suspension apparatus of claim 8 wherein the damping provided by the fine suspension device and the mechanical assembly vary as a function of both (a) the relative displacement in the generally vertical direction between the base frame and the supported frame, and (b) a velocity of the generally horizontal displacement from the mechanical assembly.

10. The suspension apparatus of claim 9 wherein the damping provided by the fine suspension device and the mechanical assembly increases as the relative displacement in the generally vertical direction between the base frame and the supported frame increases above and decreases below the neutral height.

11. The suspension apparatus of claim 9 wherein the damping provided by the fine suspension device and the mechanical assembly increases as the relative displacement in the generally vertical direction between the base frame and the supported frame increases above and decreases below a minimum damping height that is not equal to the neutral height.

12. The suspension apparatus of claim 10 wherein the damping provided by the fine suspension device and the mechanical assembly is greater as the relative displacement in the generally vertical direction between the base frame and the supported frame decreases below the neutral height by a given amount X than when the relative displacement in the generally vertical direction between the base frame and the supported frame increases above the neutral height by the given amount X.

13. The suspension apparatus of claim 8 wherein the neutral height is between 20% and 45% of a travel distance from the minimum height to the maximum height.

14. The suspension apparatus of claim 7 wherein the neutral height is between 55% and 80% of a travel distance from the minimum height to the maximum height.

15. The suspension apparatus of claim 1 wherein the mechanical assembly comprises:
a two-arm vertical linkage comprising:
an upper link arm; and
a lower link arm pivotably coupled to the upper link arm, and
a lever arm having a first end and a second end, the first end of the lever arm coupled to
an end of the two-arm vertical linkage, the second end configured to be coupled to
the fine suspension device.

16. The suspension apparatus of claim 15 wherein the first end of the lever arm is configured to rotate about a generally horizontal axis in response to movement of the two-arm vertical linkage caused by the relative displacement between the supported frame and the base frame in the generally vertical direction.

17. The suspension apparatus of claim 16 wherein the lever arm is configured to maintain a fixed angular relationship with the end of the two-arm vertical linkage coupled to the lever arm during rotation of the lever arm about the generally horizontal axis.

18. The suspension apparatus of claim 17 wherein the angular relationship maintained between the lever arm and the end of the two-arm vertical linkage comprises an angle between 15 and 165 degrees.

19. The suspension apparatus of claim 18 wherein the angular relationship maintained between the lever arm and the end of the two-arm vertical linkage comprises an angle between 30 and 90 degrees.

20. The suspension apparatus of claim 19 wherein the angle between the lever arm and the end of the two-arm vertical linkage is approximately 60 degrees.

21. The suspension apparatus of claim 1 wherein the scissor linkage being not directly coupled to the coarse suspension device and the fine suspension device results in a reduction in friction of the suspension apparatus.

22. The suspension apparatus of claim 1 wherein a displacement of the base frame in the generally vertical direction causes a displacement of the supported frame in a direction generally opposite that of the base frame.

23. The suspension apparatus of claim 22 wherein the displacement of the supported frame caused by the displacement of the base frame is approximately equal to the displacement of the base frame.

24. The suspension apparatus of claim 1 wherein the fine suspension device is pivotably coupled to one of the base frame and the supported frame.

25. A passive suspension apparatus for supporting a payload, the passive suspension apparatus comprising:
   a base frame and a supported frame, the supported frame coupled to the base frame, the supported frame configured to be disposed vertically a neutral height above the base frame when a payload having a payload weight is disposed on the supported frame, the passive suspension apparatus configured to support relative displacement in a generally vertical direction between the supported frame and the base frame from a minimum height to a maximum height, the neutral height being between the minimum height and the maximum height, the supported frame being coupled to the base frame via:
      a scissor linkage, the scissor linkage comprising two crossed scissor arms pivotably coupled together about a central pivot, each of the two crossed scissor arms extending from the base frame to the supported frame, the two crossed scissor arms being free to rotate relative to each other as the supported frame and the base frame move closer to and farther away from each other;
   a coarse suspension device coupling the base frame to the supported frame, the coarse suspension device configured to oppose a relative displacement in the generally vertical direction between the base frame and the supported frame, the coarse suspension device being adjustable to support the payload at the neutral height;
   a mechanical assembly configured to convert the relative displacement in the generally vertical direction between the base frame and the supported frame into a generally horizontal displacement; and
   a fine suspension device operably coupled to the mechanical assembly to provide damping to the horizontal displacement from the mechanical assembly, the mechanical assembly and the fine suspension device coupling the base frame to the supported frame;
   wherein the passive suspension apparatus comprises only passive components,
   wherein a force applied to one of the base frame and the supported frame in the generally vertical direction causes a generally opposite force to be applied to the other of the base frame and the supported frame,
   wherein the damping provided by the fine suspension device and the mechanical assembly vary as a function of both (a) the relative displacement in the generally vertical direction between the base frame and the supported frame, and (b) a velocity of the generally horizontal displacement from the mechanical assembly, and
   wherein the damping provided by the fine suspension device and the mechanical assembly varies in a non-linear manner such that:
      the amount of damping provided in response to the relative displacement in the generally vertical direction between the base frame and the supported frame is different for an upward displacement of a given amount X than for a downward displacement of the given amount X.

26. The suspension apparatus of claim 25 wherein the mechanical assembly and the fine suspension device couple the base frame to the supported frame without being coupled to the scissor linkage.

27. The suspension apparatus of claim 25 wherein the second force is generally out of phase with the first force.

* * * * *